US011968452B2

(12) United States Patent
Kojima et al.

(10) Patent No.: US 11,968,452 B2
(45) Date of Patent: Apr. 23, 2024

(54) IMAGING APPARATUS

(71) Applicant: Panasonic Intellectual Property Management Co., Ltd., Osaka (JP)

(72) Inventors: Hiroyuki Kojima, Osaka (JP); Masayuki Yamashita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 374 days.

(21) Appl. No.: 17/425,358

(22) PCT Filed: Mar. 4, 2020

(86) PCT No.: PCT/JP2020/009222
§ 371 (c)(1),
(2) Date: Jul. 23, 2021

(87) PCT Pub. No.: WO2020/179832
PCT Pub. Date: Sep. 10, 2020

(65) Prior Publication Data
US 2022/0103753 A1 Mar. 31, 2022

(30) Foreign Application Priority Data

Mar. 5, 2019 (JP) .................. 2019-039735

(51) Int. Cl.
*H04N 23/68* (2023.01)
*G03B 17/14* (2021.01)
(52) U.S. Cl.
CPC ........... *H04N 23/687* (2023.01); *G03B 17/14* (2013.01)
(58) Field of Classification Search
CPC ...... H04N 23/687; H04N 23/60; H04N 23/62; H04N 23/6812; H04N 25/61; G03B 17/14;
(Continued)

(56) References Cited

U.S. PATENT DOCUMENTS 10,306,151 B2 * 5/2019 Murakita .............. A61B 1/045
2009/0251554 A1 * 10/2009 Kido .................... H04N 25/443
348/222.1
(Continued)

FOREIGN PATENT DOCUMENTS

JP 9-230410 A 9/1997
JP 2000-314834 A 11/2000
(Continued)

OTHER PUBLICATIONS

Office Action for corresponding Japanese Application No. 2021-503626 dated May 9, 2023 and its English Machine translation.
(Continued)

*Primary Examiner* — Kelly L Jerabek
(74) *Attorney, Agent, or Firm* — Renner, Otto, Boisselle & Sklar, LLP

(57) ABSTRACT

An imaging apparatus includes: an imaging sensor that captures an object image formed through an interchangeable lens to generate image data; a driver that performs image blur correction by moving the imaging sensor in a plane perpendicular to an optical axis; and a controller that causes the driver to move the imaging sensor. The controller causes the driver to move the imaging sensor automatically, thereby detecting a movable amount of the imaging sensor that does not cause a vignetting in the captured image at a time when moving the imaging sensor for image blur correction, and causes the driver to move the imaging sensor within a range of the detected movable amount.

5 Claims, 22 Drawing Sheets

(58) Field of Classification Search
CPC .............. G03B 5/00; G03B 2205/0038; G03B 2206/00
See application file for complete search history.

(56) References Cited

U.S. PATENT DOCUMENTS

| | | |
|---|---|---|
| 2016/0269641 A1 | 9/2016 | Noguchi |
| 2017/0111624 A1* | 4/2017 | Jingu .................... H04N 25/61 |
| 2018/0288329 A1* | 10/2018 | Wada .................... G02B 27/646 |
| 2019/0045128 A1* | 2/2019 | Saito .................... H04N 23/81 |

FOREIGN PATENT DOCUMENTS

| | | |
|---|---|---|
| JP | 2007-322481 A | 12/2007 |
| JP | 2010-021614 A | 1/2010 |
| JP | 2010-035131 A | 2/2010 |
| JP | 2011-242666 A | 12/2011 |
| JP | 2004-056581 A | 2/2014 |
| JP | 2014-050081 A | 3/2014 |
| JP | 2016-166956 A | 9/2016 |
| JP | 2017-146362 A | 8/2017 |

OTHER PUBLICATIONS

International Search Report for corresponding International Application No. PCT/JP2020/009222 dated May 26, 2020 and its English translation.
International Preliminary Report on Patentability for corresponding International Application No. PCT/JP2020/009222 dated Aug. 25, 2021 (English translation).

* cited by examiner

| LENS MODEL NUMBER | SETTING VALUE OF CORRECTION RANGE SETTING |
|---|---|
| AB1-50 | 90% |
| CX-35 | 80% |
| WX-100 | 70% |

Fig.20

| LENS MODEL NUMBER | SETTING VALUE OF CORRECTION RANGE SETTING |
|---|---|
| W-100 | 90% |
| AB1-50 | 90% |
| B-200 | 80% |
| CX-35 | 80% |
| S-14 | 90% |
| WX-100 | 70% |
| ... | ... |

Fig.21

| APERTURE VALUE | FOCAL LENGTH | SETTING VALUE OF CORRECTION RANGE SETTING |
|---|---|---|
| F3.5 | 35mm | 80% |
| F3.5 | 50mm | 90% |
| F3.5 | 70mm | 90% |
| F5.6 | 35mm | 90% |
| F5.6 | 50mm | 100% |
| F5.6 | 70mm | 90% |
| F11 | 35mm | 90% |
| F11 | 50mm | 100% |
| F11 | 70mm | 90% |
| F18 | 35mm | 90% |
| F18 | 50mm | 90% |
| F18 | 70mm | 90% |

IMAGING APPARATUS

TECHNICAL FIELD

The present disclosure relates to an imaging apparatus having a shake correction function.

BACKGROUND ART

Patent Document 1 discloses a digital camera that performs shake correction (image blur correction) by moving an imaging sensor in a plane perpendicular to an optical axis.

PRIOR ART DOCUMENT

Patent Document

Patent Document 1: JP 2017-146362 A

SUMMARY OF INVENTION

Problem to be Solved by the Invention

In the case that an interchangeable lens, so-called an old lens, is attached to an imaging apparatus, a vignetting may occur in a captured image due to insufficiency of a size of an image circle of the interchangeable lens, when an imaging sensor is moved in a plane perpendicular to an optical axis for image blur correction.

An object of the present disclosure is to suppress occurrence of vignetting in a captured image in a lens interchangeable imaging apparatus.

Means for Solving the Problem

An imaging apparatus according to the present disclosure comprises: an imaging sensor that captures an object image formed through an interchangeable lens to generate image data; a driver that performs image blur correction by moving the imaging sensor in a plane perpendicular to an optical axis; and a controller that causes the driver to move the imaging sensor. The controller causes the driver to move the imaging sensor automatically, thereby detecting a movable amount of the imaging sensor that does not cause a vignetting in the captured image at a time when moving the imaging sensor for image blur correction, and causes the driver to move the imaging sensor within a range of the detected movable amount.

Effect of the Invention

According to the present disclosure, when the imaging sensor is moved for image blur correction, the movable amount of the imaging sensor which does not generate vignetting in the captured image can be automatically detected, and the imaging sensor can be driven within the range of the movable amount. Therefore, it is possible to suppress the occurrence of vignetting in the captured image.

BRIEF DESCRIPTION OF DRAWINGS

FIGS. 17A to 17D are diagrams illustrating a second example of an old lens registration/selection processing;

FIG. 18 is a diagram showing an example of a list of correction range setting data;

FIG. 20 is a diagram illustrating an example of a master data list;

FIG. 21 is a table showing a predetermined combination of an aperture value, a focal length, and a correction range of the interchangeable lens in the digital camera of the second embodiment;

MODE FOR CARRYING OUT THE INVENTION

Hereinafter, embodiments of the present disclosure will be described with reference to the drawings as appropriate. However, in the detailed description, unnecessary portions in the description regarding a related art and substantially the same configuration may be omitted. This is to simplify the description. Further, the following description and the accompanying drawings are disclosed to enable those skilled in the art to fully understand the present disclosure, and are not intended to limit the subject matter of the claims. Hereinafter, a digital camera will be described as an example of an imaging apparatus.

First Embodiment

A digital camera of the present embodiment has a shake correction function that reduces an influence of camera shake on a captured image, in each of an interchangeable lens and a camera body. Hereinafter, a configuration and an operation of the camera of the present embodiment will be described in detail. Note that, in the following description, a function of correcting shake by shifting a correction lens in the interchangeable lens is referred to as "optical image stabilizer (OIS) function". The function of correcting shake by shifting the imaging sensor (imaging element) in the camera body is referred to as "body image stabilizer (BIS) function".

1. Configuration

Figure 1:
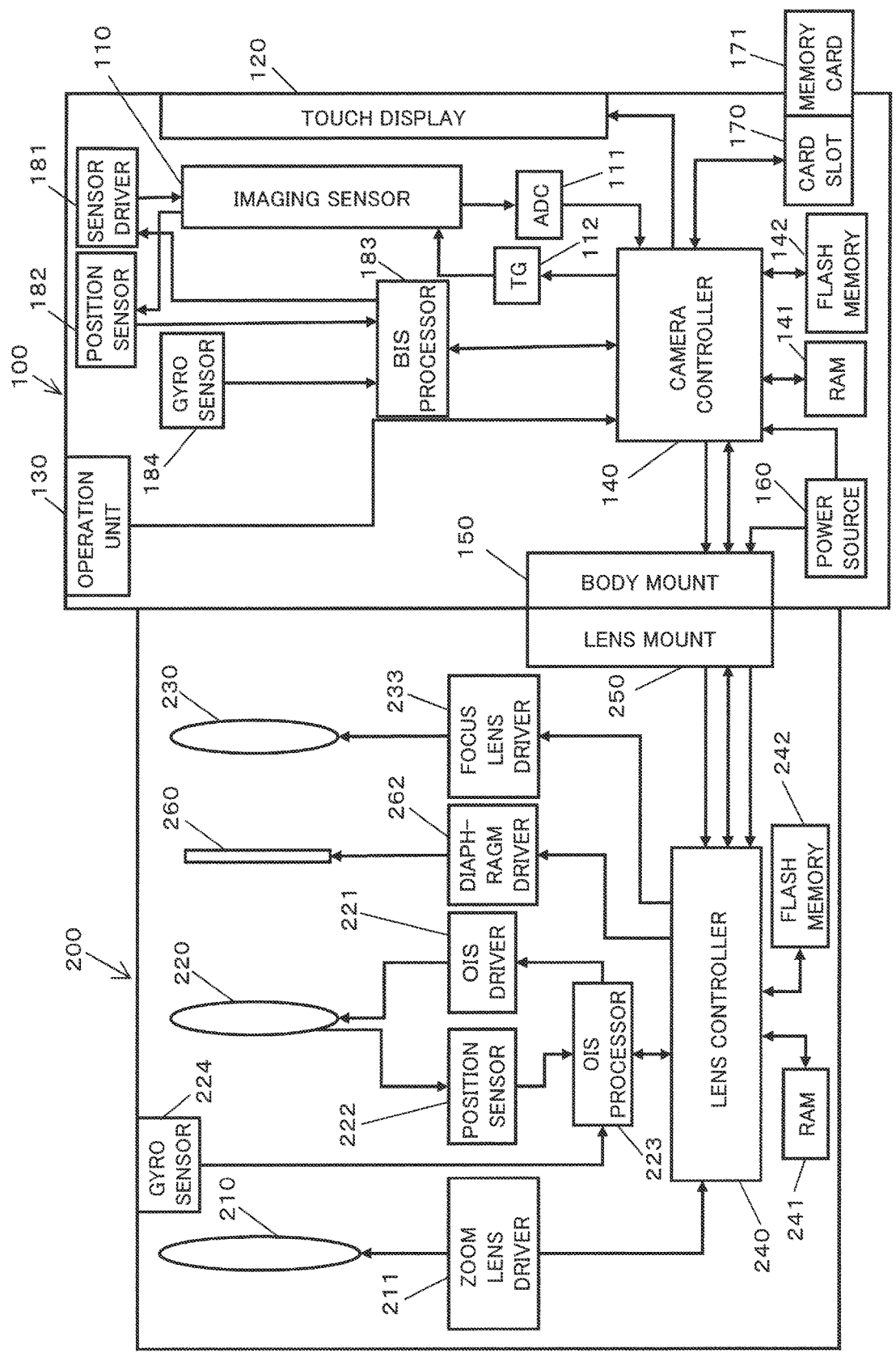
FIG. 1 is a block diagram showing a configuration of a digital camera of a first embodiment.

FIG. 1 is a block diagram showing a configuration of a digital camera according to a first embodiment. The digital camera 1 includes a camera body 100, and an interchangeable lens 200 that can be mounted to the camera body 100.

1-1. Camera Body

The camera body 100 (an example of an imaging apparatus) includes an imaging sensor 110, a touch display 120, an operation unit 130, a camera controller 140, a body mount 150, a power source 160, and a card slot 170.

The camera controller 140 controls the entire operation of the digital camera 1 by controlling a component such as the imaging sensor 110, in accordance with an instruction from a release button. The camera controller 140 transmits a vertical synchronization signal to a timing generator 112. In parallel with this, the camera controller 140 generates an exposure synchronization signal. The camera controller 140 periodically transmits the generated exposure synchronization signal to a lens controller 240 through the body mount 150 and a lens mount 250. The camera controller 140 uses a DRAM 141 as a work memory during a control operation and an image processing operation. The camera controller 140 is an example of a controller.

The imaging sensor 110 is an element that captures an object image incident through the interchangeable lens 200, to generate image data. The imaging sensor 110 is, for example, a CCD, a CMOS imaging sensor, or an NMOS imaging sensor. The generated image data is digitized by an AD converter 111. The digitized image data is subjected to inversion processing in vertical and horizontal directions and other predetermined image processing by the camera controller 140. Other predetermined image processing includes, for example, gamma correction processing, white balance correction processing, flaw correction processing, YC conversion processing, electronic zoom processing, and JPEG compression processing.

The imaging sensor 110 operates at timing controlled by the timing generator 112. The imaging sensor 110 generates a still image or moving image for recording, or a live view image. The live view image is mainly a moving image and is displayed on the touch display 120 so that the user determines a composition for capturing a still image.

The touch display 120 displays various kinds of information including an image such as a live view image, and a menu screen. The touch display 120 can be configured using, for example, a liquid crystal display device or an organic EL display device. The touch display 120 is also a pointing device having a touch operation detection function and can accept a touch operation by a user. The touch operation detection function may be embedded integrally to a liquid crystal display device or an organic EL display device or may be configured with a touch sensor panel that is a separate member from these display devices. The touch display 120 is an example of a display unit and an operation unit and configures a graphic user interface that accepts user operations based on images.

Figure 2:
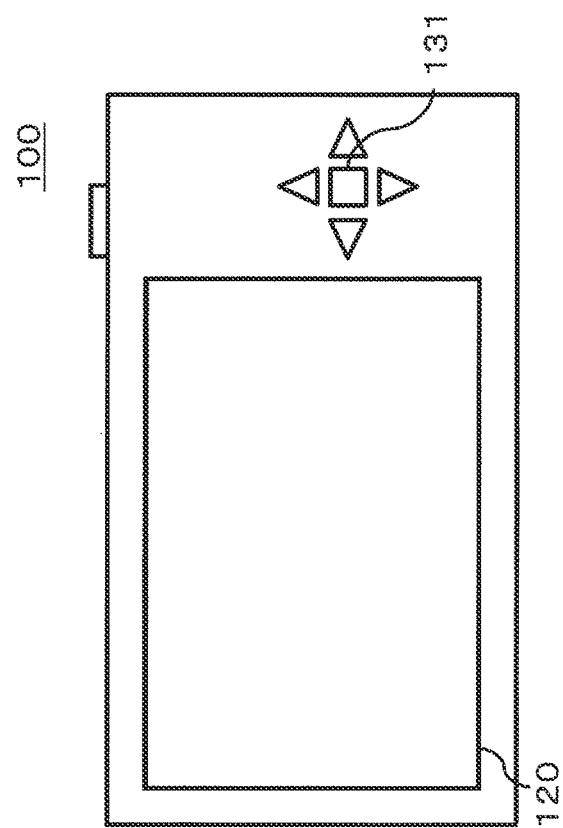
FIG. 2 is a rear view of the digital camera.

The operation unit 130 includes various operation members such as a release button for instructing start of capturing, a mode dial for setting a capturing mode, and a power switch. Further, as shown in FIG. 2, the operation unit 130 includes a joystick 131 that accepts a tilting operation in up, down, left, and right directions by the user. The joystick 131 outputs a signal indicating a tilted direction among the up, down, left, and right directions.

A flash memory 142 stores data necessary for the camera controller 140 to perform a control operation.

The card slot 170 can be loaded with a memory card 171 and controls the memory card 171 based on control from the camera controller 140. The digital camera 1 can store image data in the memory card 171 and can read image data from the memory card 171.

The power source 160 is a circuit that includes a secondary battery and supplies power to each element in the digital camera 1.

The body mount 150 can be mechanically and electrically connected to the lens mount 250 of the interchangeable lens 200. The body mount 150 can transmit and receive data between with the interchangeable lens 200 through the lens mount 250. The body mount 150 transmits an exposure synchronization signal received from the camera controller 140, to the lens controller 240 through the lens mount 250. Further, other control signals received from the camera controller 140 are transmitted to the lens controller 240 through the lens mount 250. In addition, the body mount 150 transmits a signal received from the lens controller 240 through the lens mount 250, to the camera controller 140. Further, the body mount 150 supplies power from the power source 160 to the entire interchangeable lens 200 through the lens mount 250.

In addition, as a configuration to realize a BIS function (a function of correcting camera shake by shifting the imaging sensor 110), the camera body 100 further includes a gyro sensor 184 (shake detection unit) that detects shake of the camera body 100, and a BIS processor 183 that controls a shake correction process based on a detection result of the gyro sensor 184. Furthermore, the camera body 100 includes a sensor driver 181 that moves the imaging sensor 110, and a position sensor 182 that detects a position of the imaging sensor 110.

The sensor driver 181 can be realized by a magnet and a flat coil, for example. The position sensor 182 is a sensor that detects a position of the imaging sensor 110 in a plane perpendicular to an optical axis of an optical system. The position sensor 182 can be realized by a magnet and a Hall element, for example. The sensor driver 181 is an example of a driver.

The BIS processor 183 controls the sensor driver 181 to shift the imaging sensor 110 in a plane perpendicular to the optical axis to cancel image blur of an object image caused by shake of the camera body 100, based on a signal from the gyro sensor 184 and a signal from the position sensor 182.

1-2. Interchangeable Lens

The interchangeable lens 200 includes an optical system, the lens controller 240, and the lens mount 250. The optical system includes a zoom lens 210, an optical image stabilizer (OIS) lens 220, a focus lens 230, and a diaphragm 260.

The zoom lens 210 is a lens to change magnification of an object image formed by the optical system. The zoom lens 210 includes one or a plurality of lenses. The zoom lens 210 is driven by a zoom lens driver 211. The zoom lens driver 211 includes a zoom ring that can be operated by the user. Alternatively, the zoom lens driver 211 may include a zoom lever and an actuator or a motor. The zoom lens driver 211 moves the zoom lens 210 along an optical axis direction of the optical system in accordance with an operation by the user.

The focus lens 230 is a lens to change a focus state of an object image that is formed on the CMOS imaging sensor 110 by the optical system. The focus lens 230 includes one or a plurality of lenses. The focus lens 230 is driven by a focus lens driver 233.

The focus lens driver 233 includes an actuator or a motor and moves the focus lens 230 along the optical axis of the optical system based on control of the lens controller 240. The focus lens driver 233 can be realized by a DC motor, a stepping motor, a servo motor, an ultrasonic motor, or the like.

The OIS lens 220 is a lens to correct blur of an object image formed by the optical system of the interchangeable lens 200, in an OIS function (a function of correcting camera shake by shifting the OIS lens 220). The OIS lens 220 moves in a direction for canceling shake of the digital camera 1, thereby reducing blur of the object image on the imaging sensor 110. The OIS lens 220 includes one or a plurality of lenses. The OIS lens 220 is driven by an OIS driver 221.

The OIS driver 221 shifts the OIS lens 220 within a plane perpendicular to an optical axis of the optical system, in response to control of an OIS processor 223. A range in which the OIS lens 220 can be driven by the OIS driver 221 is mechanically limited. The range in which the OIS lens 220 can be mechanically driven by the OIS driver 221 is referred to as "OIS lens movable range". The OIS driver 221 can be realized by a magnet and a flat coil, for example. A position sensor 222 is a sensor that detects a position of the OIS lens 220 in a plane perpendicular to an optical axis of an optical system. The position sensor 222 can be realized by a magnet and a Hall element, for example. The OIS processor 223 controls the OIS driver 221 based on an output of the position sensor 222 and an output of a gyro sensor 224 (shake detector).

The diaphragm 260 adjusts an amount of light incident on the imaging sensor 110. The diaphragm 260 is driven by a diaphragm driver 262, to control a size of an opening. The diaphragm driver 262 includes a motor or an actuator.

The gyro sensor 184 or 224 detects shake (vibration) in a yawing direction and a pitching direction based on a change in angle per unit time of the digital camera 1, that is, an angular velocity. The gyro sensor 184 or 224 outputs an angular velocity signal indicating a detected shake amount (angular velocity) to the BIS processor 183 or the OIS processor 223. The angular velocity signal outputted by the gyro sensor 184 or 224 may include a wide range of frequency components due to camera shake or mechanical noise. Instead of the gyro sensor, another sensor capable of detecting shake of the digital camera 1 can also be used.

The camera controller 140 and the lens controller 240 may be configured with a hard-wired electronic circuit or a microcomputer using a program. For example, the camera controller 140 and the lens controller 240 can be realized by a processor such as a CPU, an MPU, a GPU, a DSU, an FPGA, or an ASIC.

1-3. BIS Processor

Figure 3:
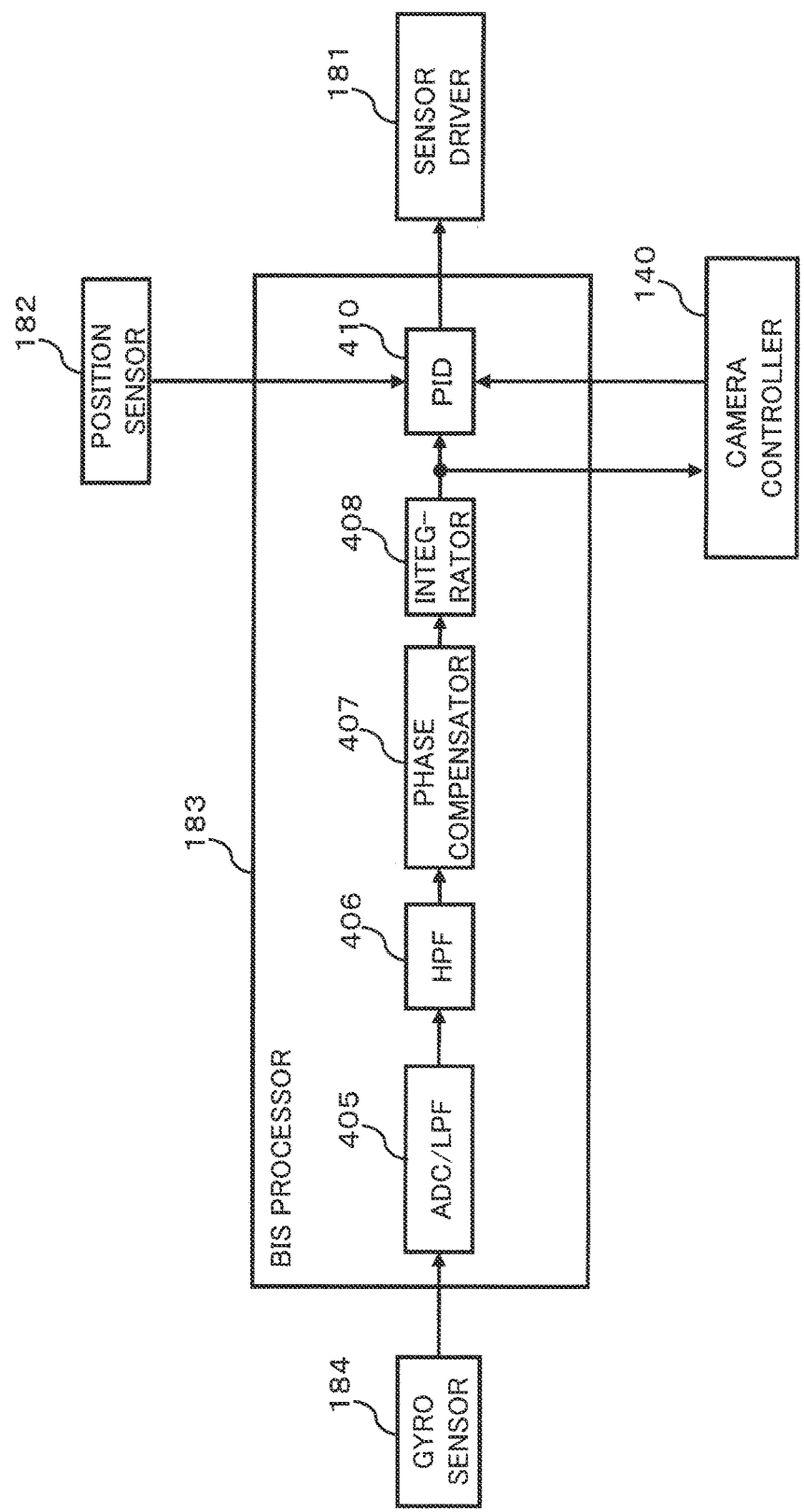
FIG. 3 is a block diagram showing a configuration of a BIS processor in the digital camera.

A configuration of the BIS processor 183 in the camera body 100 will be described with reference to FIG. 3. The BIS processor 183 includes an analog/digital conversion unit (ADC)/low pass filter (LPF) 405, a high pass filter (HPF) 406, a phase compensator 407, an integrator 408, and a PID controller 410.

The ADC/LPF 405 converts an angular velocity signal from the gyro sensor 184 from an analog format to a digital format. Further, the ADC/LPF 405 blocks a high-frequency component of the angular velocity signal converted into the digital format, in order to eliminate noise and exclusively extract shake of the digital camera 1. A photographer's camera shake frequency is a low frequency of about 1 to 10 Hz, and a cutoff frequency of the LPF is set in consideration of this point. The function of the LPF can be omitted if noise is not a problem.

The HPF 406 blocks a predetermined low frequency component included in a signal received from the ADC/LPF 405, in order to block a drift component.

The phase compensator 407 corrects phase delay caused by the sensor driver 181 and the like, with respect to a signal received from the HPF 406.

The integrator 408 integrates a signal indicating an angular velocity of shake (vibration) inputted from the phase compensator 407, to generate a signal (hereinafter, referred to as "shake detection signal") indicating an angle of the shake (vibration). The shake detection signal from the integrator 408 is inputted to the PID controller 410.

The PID controller 410 generates a drive signal for shifting the imaging sensor 110 based on a signal from the position sensor 182, a signal from the integrator 408, and a control signal from the camera controller 140, and outputs the drive signal to the sensor driver 181. The sensor driver 181 drives the imaging sensor 110 based on the drive signal. The control signal from the camera controller 140 stores, for example, information on a limited movable range Ra of the imaging sensor 110 (described later). The PID controller 410 generates the drive signal based on the information on the limited movable range Ra so that the imaging sensor 110 is not driven to deviate out of the limited movable range Ra.

1-4. OIS Processor

Figure 4:
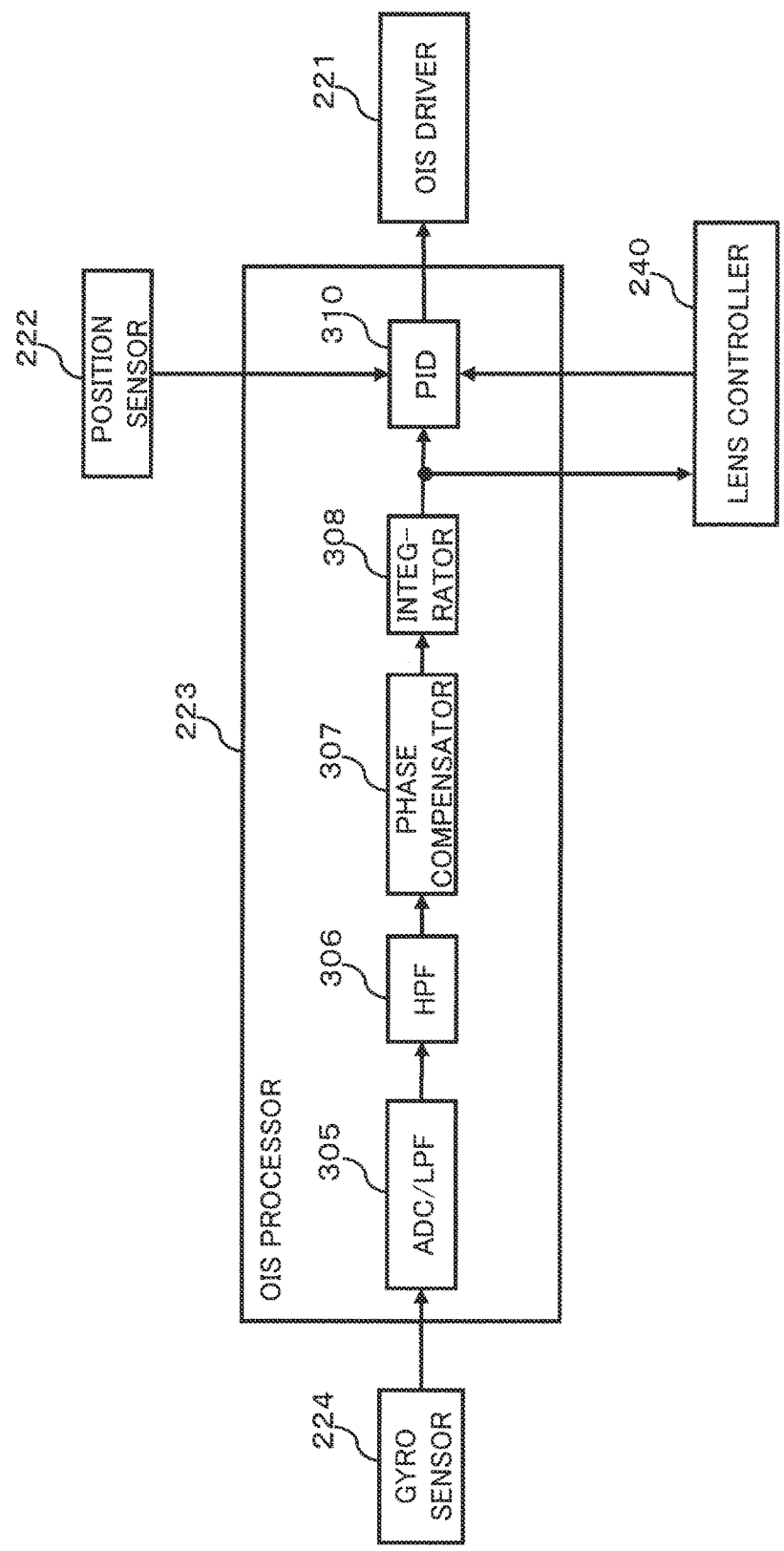
FIG. 4 is a block diagram showing a configuration of an OIS processor in the digital camera.

A configuration of the OIS processor 223 in the interchangeable lens 200 will be described with reference to FIG. 4. The OIS processor 223 includes an analog/digital conversion (ADC)/low pass filter (LPF) 305, a high pass filter (HPF) 306, a phase compensator 307, an integrator 308, and a PID controller 310.

The ADC/LPF 305 converts an angular velocity signal from the gyro sensor 224 from an analog format to a digital format. Further, the ADC/LPF 305 blocks a high-frequency component of the angular velocity signal converted into the digital format, in order to eliminate noise and exclusively extract shake of the digital camera 1. A photographer's camera shake frequency is a low frequency of about 1 to 10 Hz, and a cutoff frequency of the LPF is set in consideration of this point. The function of the LPF can be omitted if noise is not a problem.

The HPF 306 blocks a predetermined low frequency component included in a signal received from the ADC/LPF 305, in order to block a drift component.

The phase compensator 307 corrects phase delay caused by the OIS driver 221, the lens-body communication, and the like, with respect to the signal received from the HPF 306.

The integrator 308 integrates a signal indicating an angular velocity of shake (vibration) inputted from the phase compensator 307, to generate a shake detection signal indicating an angle of the shake (vibration). The shake detection signal from the integrator 308 is inputted to the PID controller 310.

The PID controller 310, generates a drive signal for shifting the OIS lens 220 based on a signal from the position sensor 222, a signal from the integrator 308, and a control signal from the camera controller 140, and outputs the drive signal to the OIS driver 221. The OIS driver 221 drives the OIS lens 220 based on the drive signal.

2. Operation

Hereinafter, an operation of the digital camera 1 configured as described above will be described.

The BIS processor 183 of the camera body 100 generates a drive signal for driving the imaging sensor 110 based on a detection signal from the gyro sensor 184 and position information from the position sensor 182, to transmit the drive signal to the sensor driver 181. The sensor driver 181 shifts the imaging sensor 110 on a plane perpendicular to an optical axis to cancel shake detected by the gyro sensor 184, in accordance with the drive signal from the BIS processor 183.

The OIS processor 223 of the interchangeable lens 200 generates a drive signal for driving the OIS lens 220 based on a detection signal from the gyro sensor 224 and position information from the position sensor 222, to transmit the drive signal to the OIS driver 221. In accordance with the drive signal, the OIS driver 221 shifts the OIS lens 220 on a plane perpendicular to the optical axis to cancel shake detected by the gyro sensor 224.

For shake correction, either one of the OIS function and the BIS function may be activated, or both may be activated simultaneously.

As described above, the digital camera 1 reduces an influence of camera shake in a captured image by activating the shake correction function based on a detected shake signal.

Figure 5B:
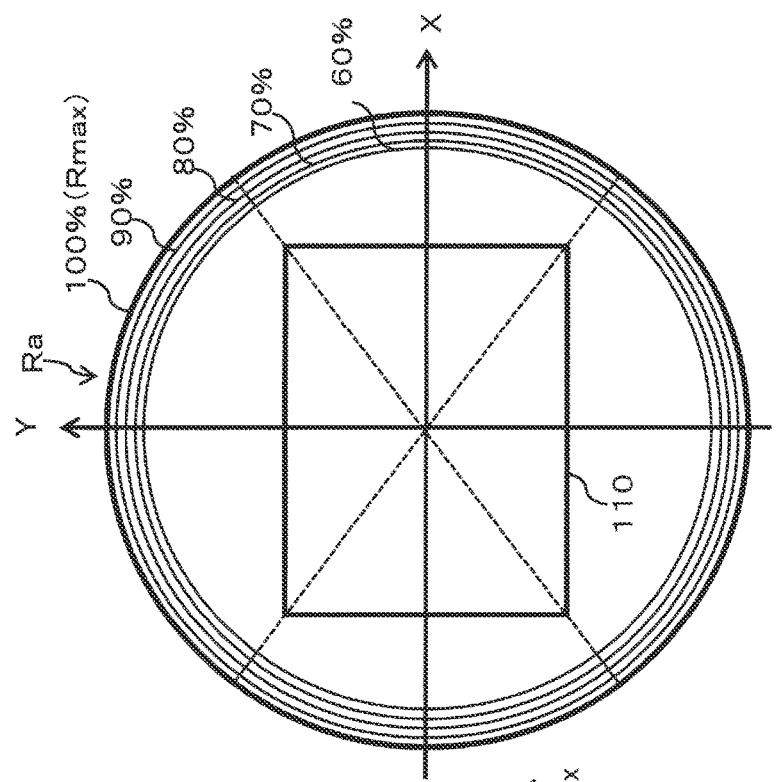
FIGS. 5A and 5B are views illustrating a movable range of an imaging sensor.
Figure 5A:
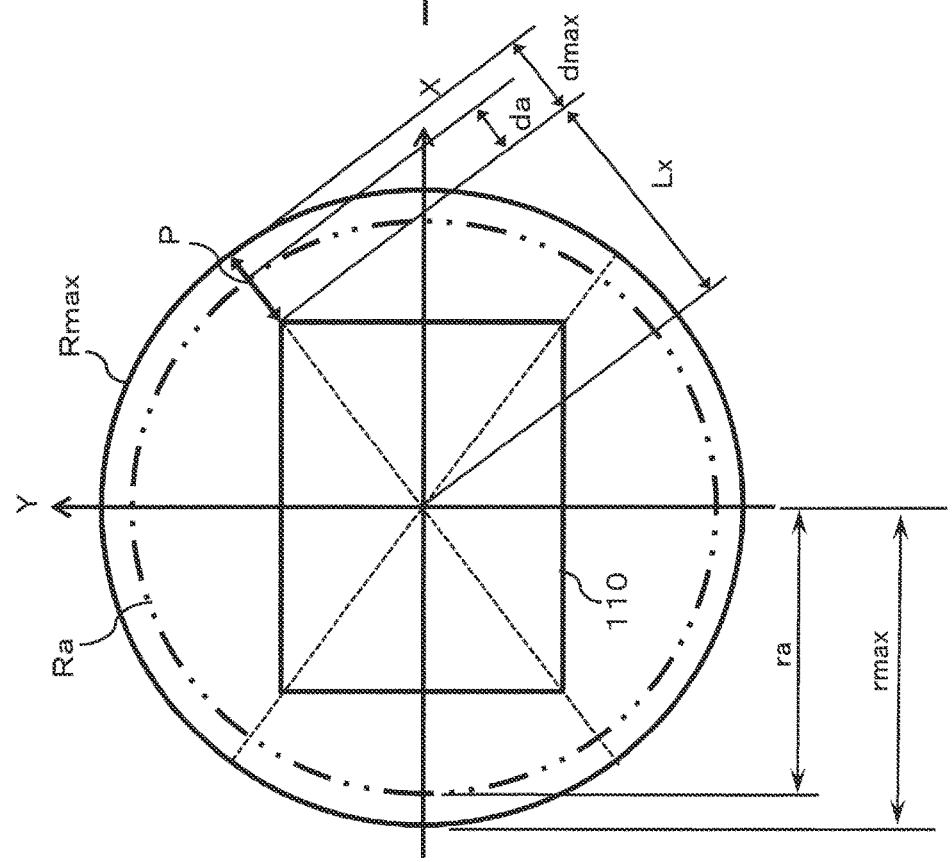

FIGS. 5A and 5B are views illustrating a movable range of the imaging sensor 110. FIG. 5A shows a positional relationship between the imaging sensor 110 and a movable range when the imaging sensor 110 is not driven. When the imaging sensor 110 is not driven, a center of the imaging sensor 110 (a center of an imaging surface) is located at an intersection of an X axis and a Y axis, as shown in FIG. 5A. The position of the imaging sensor 110 at this time is referred to as "sensor reference position". An X-axis direction is a direction parallel to a width direction of the imaging sensor 110. A Y-axis direction is a direction parallel to a height direction of the imaging sensor 110. In FIG. 5A, a diagonal length between the center of the imaging sensor 110 and a corner of the imaging sensor 110 is indicated by Lx.

The sensor driver 181 can move the imaging sensor 110 within a maximum movable range Rmax. The maximum movable range Rmax is a maximum range in which the sensor driver 181 can drive the imaging sensor 110, and is determined by a mechanical structure of the sensor driver 181. In FIG. 5A, a radius of the maximum movable range Rmax is indicated by rmax. A distance in a radial direction between a corner of the imaging sensor 110 at the sensor reference position and an outer circumference circle of the maximum movable range Rmax is indicated by dmax. The distance dmax corresponds to a maximum distance (maximum movement distance) in which the sensor driver 181 can mechanically move the imaging sensor 110 in a diagonal direction. Hereinafter, the distance dmax is referred to as "maximum movable amount dmax" as appropriate. The radius rmax of the maximum movable range Rmax has a size obtained by adding the maximum movable amount dmax to a diagonal length Lx of the imaging sensor 110.

A movable range of the imaging sensor 110 can be limited to a range smaller than the maximum movable range Rmax by outputting an instruction signal (information) for limiting the movable range to the PID controller 410 from the camera controller 140. The movable range thus limited is hereinafter referred to as "limited movable range Ra" as appropriate. In FIG. 5A, a radius of the limited movable range Ra is indicated by ra. A distance in a radial direction between the corner of the imaging sensor 110 at the sensor reference position and an outer circumference circle of the limited movable range Ra is indicated by da. Hereinafter, the distance da is appropriately referred to as "limited movable amount da". The radius ra of the limited movable range Ra has a size obtained by adding the limited movable amount da to the diagonal length Lx of the imaging sensor 110. A ratio (%) of the limited movable amount da to the maximum movable amount dmax is hereinafter referred to as "movable amount limitation rate" as appropriate. The movable amount limitation rate being 100% means that the limited movable range Ra and the maximum movable range Rmax have a same size (radius), and a movable amount of the imaging sensor 110 is not limited, that is, the imaging sensor 110 can be driven within the maximum movable range Rmax.

FIG. 5B shows a positional relationship between the imaging sensor 110 and the limited movable range Ra when the imaging sensor 110 is not driven. FIG. 5B shows, as an example, the limited movable range Ra when the movable amount limitation rate is 100%, 90%, 80%, 70%, and 60%. As is apparent from FIG. 5B, the radius of the limited movable range Ra becomes smaller as the movable amount limitation rate becomes smaller. Note that the movable amount limitation rate can take an appropriate value other than 100%, 90%, 80%, 70%, and 60%.

The camera body 100 communicates with the interchangeable lens 200 to acquire information regarding an image circle C of the interchangeable lens 200 (hereinafter, appropriately referred to as "image circle information"), and limits a movement of the imaging sensor 110 of the interchangeable lens 200 so that the imaging sensor 110 does not deviate out of the image circle C during shake correction. Here, the image circle is a circular light irradiation range which is formed by light passing through a lens on a plane perpendicular to an optical axis of the lens (interchangeable lens), and has, for example, luminance and lens performance of a certain ratio or more with respect to a center of the lens. The image circle information is information indicating a size (for example, radius) of the image circle C.

Note that, for example, the camera body 100 acquires the image circle information of the interchangeable lens 200 as follows. For example, image circle information is stored in the flash memory 242 of the interchangeable lens 200. The camera controller 140 of the camera body 100 communicates with the lens controller 240 of the interchangeable lens 200 to acquire information stored in the flash memory 242. Note that the image circle information may be stored in the flash memory 142 of the camera body 100 in association with model information of the interchangeable lens 200. In this case, the camera controller 140 communicates with the interchangeable lens 200, acquires the model information from the interchangeable lens 200, for example, and acquires image circle information corresponding to the acquired model information from the flash memory 142.

Figure 6B:
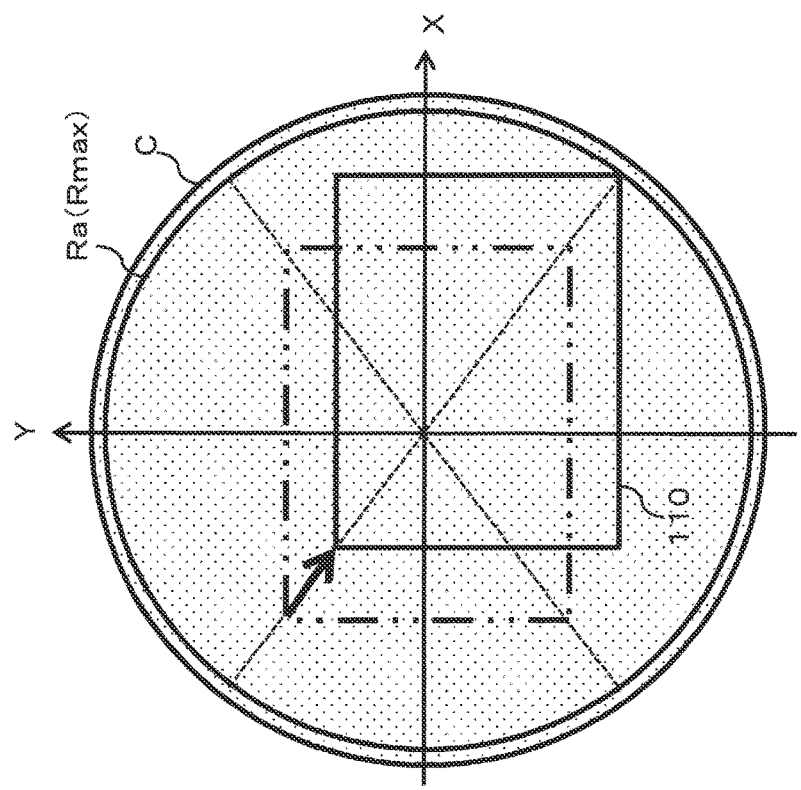
FIGS. 6A and 6B are views illustrating a relative positional relationship between the imaging sensor and an image circle.
Figure 6A:
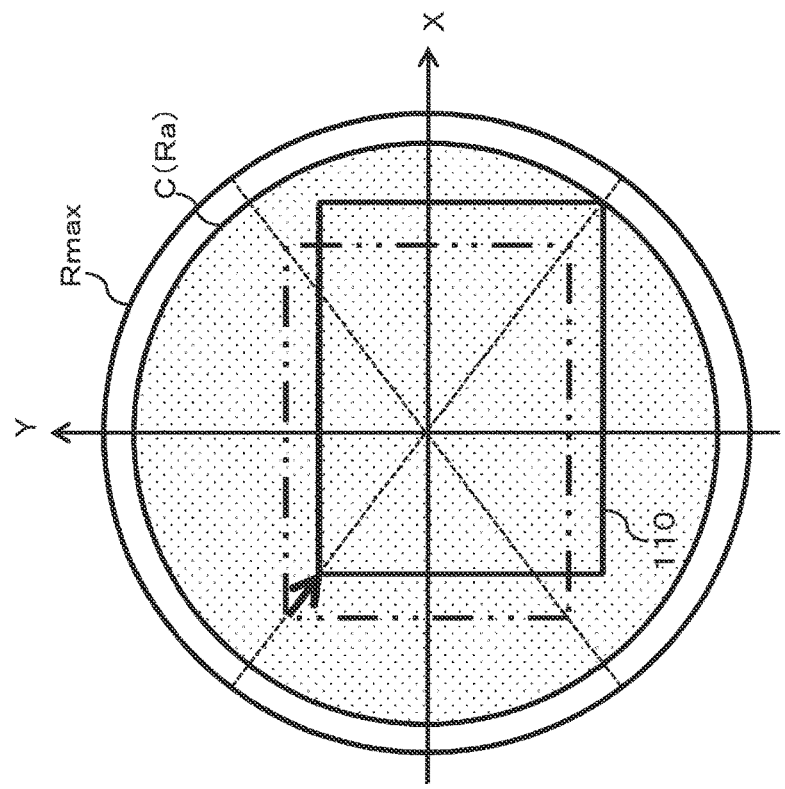

FIGS. 6A and 6B are views illustrating a relative positional relationship between the imaging sensor 110 and an image circle. FIGS. 6A and 6B show a relative positional relationship between the imaging sensor 110 and the image circle C when the BIS function is activated for shake correction. As shown in FIG. 6A, when the image circle C is smaller than the maximum movable range Rmax, the camera controller 140 limits a movable amount of the imaging sensor 110 during shake correction to an amount smaller than the maximum movable amount dmax. With this, as shown in FIG. 6A, a movable range of the imaging sensor 110 is limited to a partial range in the maximum movable range Rmax (limited movable range Ra). Then, the camera controller 140 causes the sensor driver 181 to drive the imaging sensor 110 within the limited movable range Ra. FIG. 6A shows an example in which the limited movable range Ra has the same size (radius) as the image circle C, but the size (radius) of the limited movable range Ra is merely required to be equal to or less than the size (radius) of the image circle C. On the other hand, as shown in FIG. 6B, when the size (radius) of the image circle C indicated by the image circle information is larger than the maximum movable range Rmax, the camera controller 140 sets, as the limited movable range Ra, a range having the same size as the maximum movable range Rmax without limiting the movable range of the imaging sensor 110. Then, the camera controller 140 causes the sensor driver 181 to drive the imaging sensor 110 within the maximum movable range Rmax (the limited movable range Ra). By setting the movable range of the imaging sensor 110 in accordance with the magnitude relationship between the size (radius) of the image circle C and the size (radius) of the maximum movable range Rmax in this way, it is possible to inhibit that the imaging sensor 110 deviates from the image circle C during shake correction regardless the size of the image circle C. Therefore, occurrence of vignetting due to deviation of the imaging sensor 110 from the image circle C can be suppressed.

Note that the image circle information may be stored in the flash memory 142 of the camera body 100 in association with model information of the interchangeable lens 200. In this case, the camera controller 140 communicates with the interchangeable lens 200, acquires the model information from the interchangeable lens 200, and acquires image circle information corresponding to the acquired model information from the flash memory 142.

Here, depending on specifications of the interchangeable lens used in combination with the camera body 100, the camera body 100 may not be able to communicate with the interchangeable lens to acquire image circle information. This type of interchangeable lens includes, for example, an interchangeable lens designed for a film camera. Further, even if the camera body 100 and the interchangeable lens can communicate, the camera body 100 may not be able to acquire image circle information. This type of lens includes, for example, an interchangeable lens incapable of communication due to a difference in communication standards even if a mount type is the same. Hereinafter, an interchangeable lens incapable of acquiring image circle information when attached to the camera body 100 is appropriately referred to as an "old lens". When such an old lens is attached to the camera body 100, the camera body 100 is not able to acquire image circle information, and thus, cannot perform the above-described control for setting the limited movable range Ra based on the image circle information. In this case, the following problems may occur.

Figure 7:
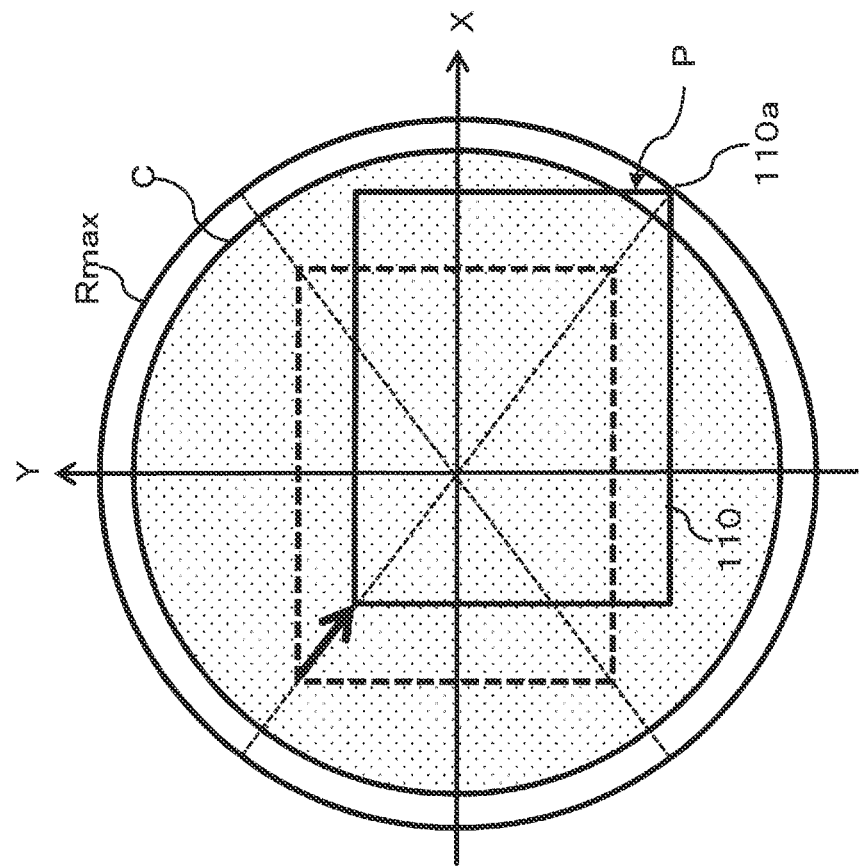
FIG. 7 is a view illustrating a relative positional relationship between the imaging sensor and the image circle when an old lens is attached.

FIG. 7 is a view illustrating a relative positional relationship between an imaging sensor and an image circle of an old lens. FIG. 7 shows a relative positional relationship between the imaging sensor 110 and the image circle C when the BIS function is activated for shake correction. As shown in FIG. 7, the image circle C of the old lens may be smaller than the maximum movable range Rmax. When such an old lens is attached to the camera body 100, the camera body 100 is not able to acquire image circle information of the old lens. Therefore, it is not possible to limit the movable amount of the imaging sensor 110 to set the limited movable range Ra. Consequently, the imaging sensor 110 may deviate out of the image circle C as indicated by an arrow P in FIG. 7. In FIG. 7, a lower right corner 110a of the imaging sensor 110 deviates out of the image circle C, and object light does not reach a deviating portion near the lower right corner 110a in the imaging sensor 110. Therefore, vignetting occurs in the captured image. Conventionally, a user needs to choose whether to use the BIS function while knowing that vignetting may occur, or to turn off the BIS function.

In view of such a problem, the camera body 100 according to the present embodiment provides an imaging apparatus that can drive an imaging sensor in an image circle of an interchangeable lens, even when it is not possible to acquire information on the size of the image circle of the interchangeable lens. A configuration and an operation for realizing this will be described below.

2.1 Automatic Setting Process of Movable Amount Limitation Rate in Digital Camera In the camera body 100 of the present embodiment, when the camera body 100 cannot acquire the image circle information of the interchangeable lens, the vignetting is automatically detected to set (change) the movable amount limitation rate. Hereinafter, the detail will be described with reference to the drawings.

Figure 8:
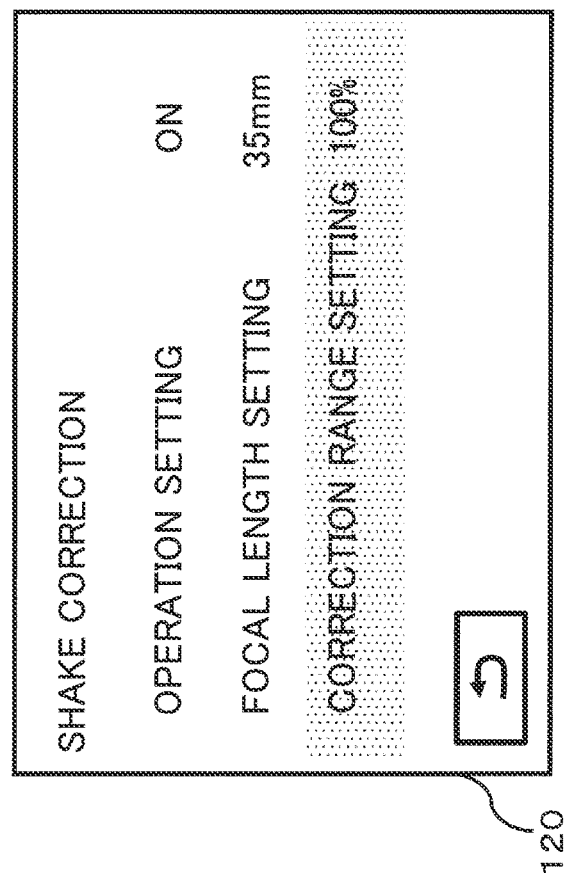
FIG. 8 is a diagram showing an example of a shake correction menu screen.

FIG. 8 is a diagram showing an example of a shake correction menu screen. When setting the movable amount limitation rate with respect to the mounted interchangeable lens (old lens), the user performs predetermined operations such as a selection from the menu and an input with shortcut key on the operation unit 130 to display the shake correction menu screen of FIG. 8 on the touch display 120. The menu screen displays items such as "operation setting", "focal length setting", and "correction range setting" as setting items related to shake correction and displays a return button. When the "operation setting" is touched, it enables selection as to whether to turn "ON" or "OFF" the shake correction. The touch operation is an example of an operation for selection and determination. Such selection and determination can also be performed by operating the operation unit 130. The touch operations described below are also the same. In FIG. 8, an example in which "ON" is selected is shown. When a touch operation is performed on the "focal length setting", the focal length of the interchangeable lens can be newly set or selected from a plurality of options. FIG. 8 shows an example in which "35 mm" is set. When the touch operation is performed on the "correction range setting", the above described movable amount limitation rate can be set. FIG. 8 shows an example in which "100%" is set as the movable amount limitation rate. Here, when the shake correction screen of FIG. 8 is called first time, "100%" as the initial value is displayed. On the other hand, after the correction range setting is performed by the user, the value of the movable amount limitation rate set by the previous correction range setting is displayed. When the touch operation is performed to the "correction range setting" in the shake correction screen of FIG. 8, the camera controller 140 displays the correction range setting screen of FIG. 9A on the touch display 120.

Figure 9A:
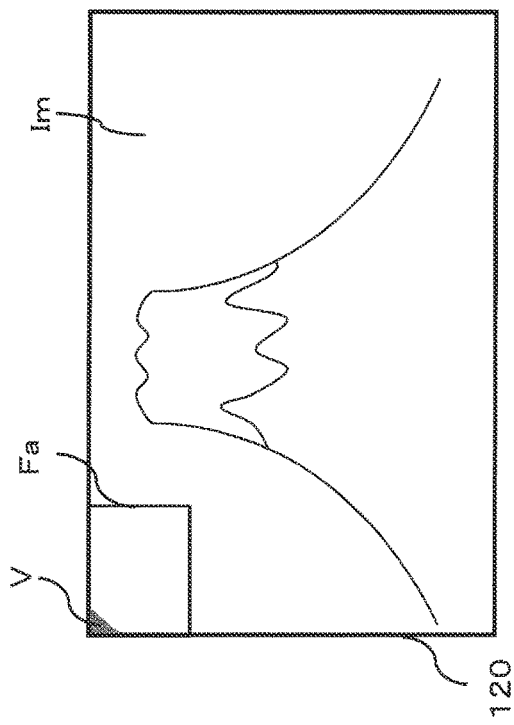
FIGS. 9A to 9D are diagrams showing an example of a screen displayed in automatic setting of a correction range.

FIGS. 9A to 9D are diagrams showing an example of a screen displayed in the automatic setting of the correction range. On the correction range setting screen of FIG. 9A, a live view image Im is displayed as a background image. The correction range setting screen of FIG. 9A shows an example of the live view image in which the live view image Im is an image on which Mt. Fuji and the surrounding sky are photographed.

The correction range setting screen displays a numerical window Wa, a correction range automatic setting button Bd, a return button Br, a gaze frame Fa.

The numerical window Wa is a window to display a setting value of the correction range setting.

The correction range automatic setting button Bd is a button to accept a user operation for causing the camera body 100 to automatically set the setting value of the correction range setting.

The return button Br is a button to accept a return operation by the user to the shake correction menu screen of FIG. 8.

The gaze frame Fa is a frame that surrounds a region where vignetting may occur in the live view image on the correction range setting screen, which is a region (gaze region) at which the user should gaze.

The numerical window Wa will be described in more detail. The numerical window Wa displays a numerical value indicating a movable amount limitation rate as a setting value. FIG. 9A shows an example in which "100%" is set as the movable amount limitation rate. The numerical value indicating the movable amount limitation rate is set by 10% order, to "100%", "90%", "80%", "70%", and "60%" for example. Note that the movable amount limitation rate may be set in increments of 1%.

The correction range setting screen of FIG. 9A shows, a screen as an example when the imaging sensor 110 is moved maximally to the lower right in the diagonal direction within the limited movable range Ra (maximum movable range Rmax) when the movable amount limitation rate is "100%". Further, an example is shown in which a size (radius) of the limited movable range Ra (maximum movable range Rmax) when the movable amount limitation rate is 100% is larger than a size (radius) of the image circle C. In this case, the lower right corner 110a of the imaging sensor 110 deviates out of the image circle C. Therefore, object light does not reach the vicinity of the lower right corner 110a of the imaging sensor 110 that deviates out of the image circle C. Consequently, vignetting V occurs in an upper left corner of the live view image Im which is the background image of the correction range setting screen in FIG. 9A. The user can recognize that the vignetting V is to occur in the upper left corner of the captured image when the movable amount limitation rate is set to 100%, by viewing the image in the gaze frame Fa in the live view image Im. In addition, the user can recognize that the movable amount limitation rate is required to be changed to a value smaller than 100% in order not to cause vignetting V. In this case, the user may simply touch the correction range automatic setting button Bd to change the value of the movable amount limitation rate by automatic setting.

Figure 10B:
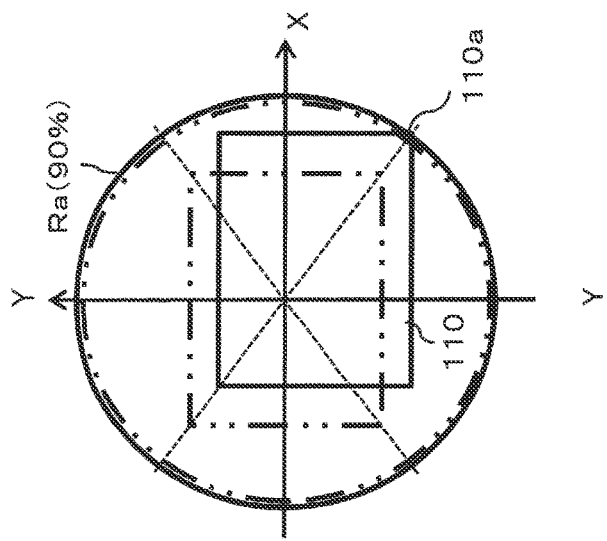
FIGS. 10A to 10C are diagrams illustrating a movement of the image sensor during the correction range automatic setting process.
Figure 10A:
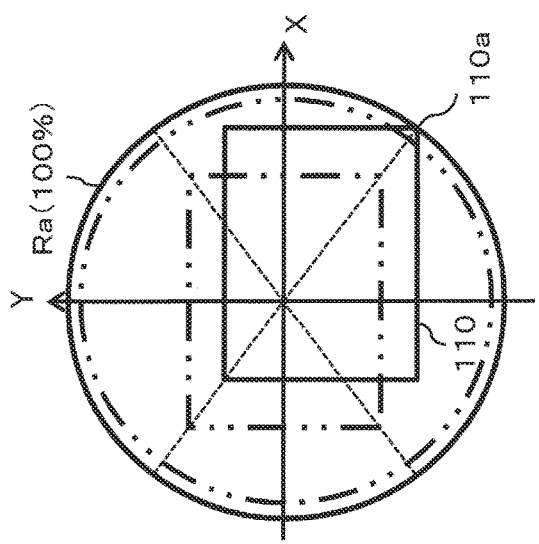
Figure 10C:
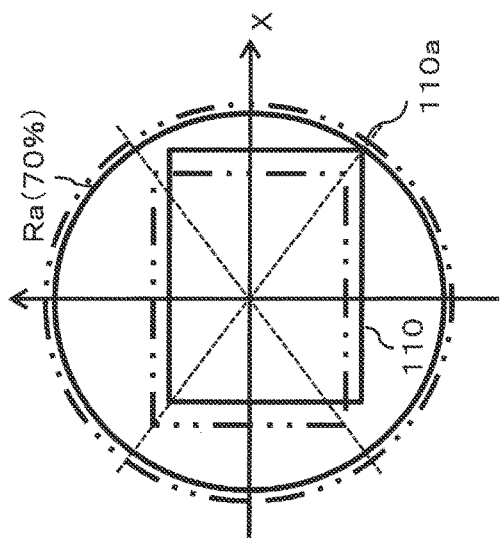

When displaying the correction range setting screen of FIG. 9A, the camera controller 140 moves the imaging sensor 110 being at the sensor reference position (the position shown in FIG. 5), maximally in a diagonal direction within the limited movable range Ra (maximum movable range Rmax) when the movable amount limitation rate is 100%, as shown in FIG. 10A. FIGS. 10A to 10C are diagrams illustrating the movement of the imaging sensor during the correction range automatic setting process. FIG. 10A shows an example in which the size (radius) of the limited movable range Ra when the movable amount limitation rate is 100% is larger than the size (radius) of the image circle C. In this case, the lower right corner 110a of the imaging sensor 110 deviates out of the image circle C. Therefore, object light does not reach the vicinity of the lower right corner 110a of the imaging sensor 110 that deviates out of the image circle C, and vignetting V occurs in a portion of the sky at the upper left corner of the live view image, which is the background image of the correction range setting screen in FIG. 9A. The user can recognize that the vignetting V is to occur in the upper left corner of the captured image when the movable amount limitation rate is set to 100%, by viewing the image in the gaze frame Fa in the live view image. In addition, the user can recognize that the movable amount limitation rate is required to be changed to a value smaller than 100% in order not to cause vignetting V.

Figure 11:
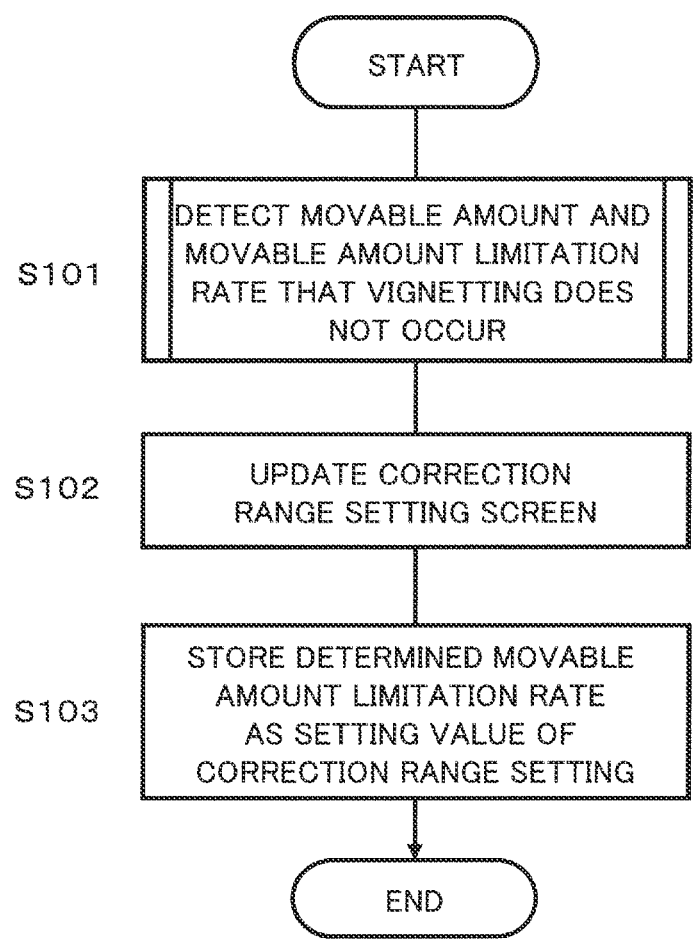
FIG. 11 is a flowchart illustrating a correction range setting process.

When a touch operation is performed on the correction range automatic setting button Bd in the correction range setting screen of FIG. 9A, the camera controller 140 performs the automatic setting operation of the correction range setting value (movable amount limitation rate) according to the flowchart shown in FIG. 11. FIG. 11 is a flowchart showing an automatic setting process of a correction range by the camera body 100.

First, the camera controller 140 performs detection processing of a movable amount and a movable amount limitation rate that the vignetting does not occur (S101). Details of this processing will be described later.

Figure 9B:
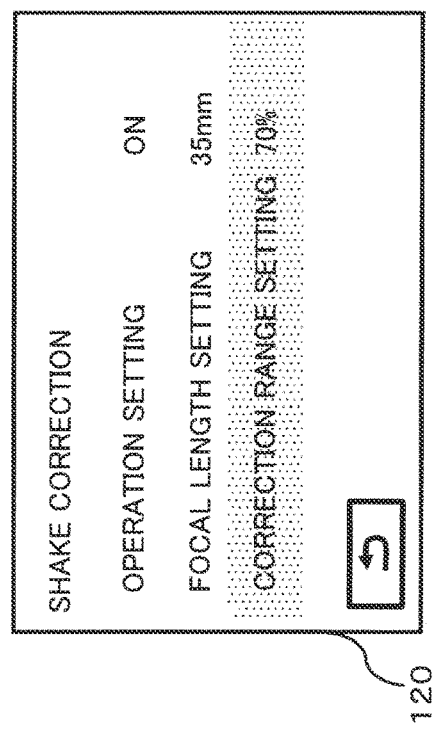
Figure 9C:
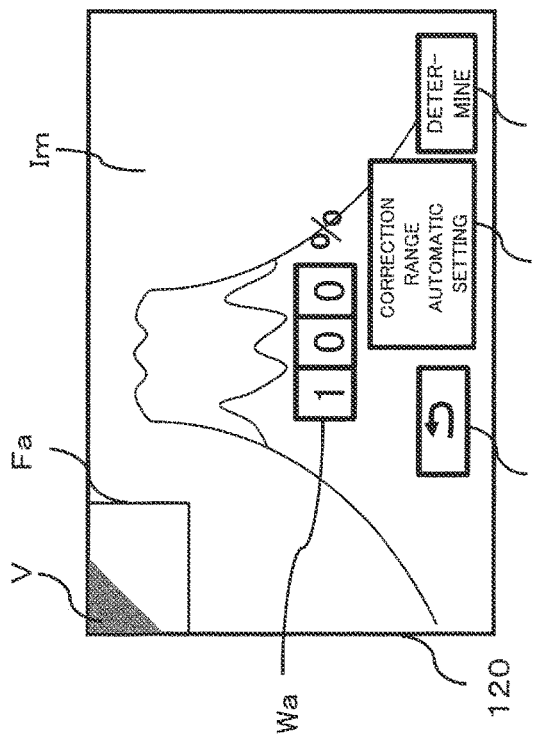

The camera controller 140 moves the imaging sensor 110 to maximally as shown in FIG. 10C by a movable amount limitation rate set based on the detection result of the vignetting in step S101, and updates the correction range setting screen as shown in FIG. 9C based on the live view image (captured image) in the moving state (S102). In FIG. 9C, there is shown an example in which vignetting is eliminated at 70% of the moving amount limitation rate.

Figure 9D:
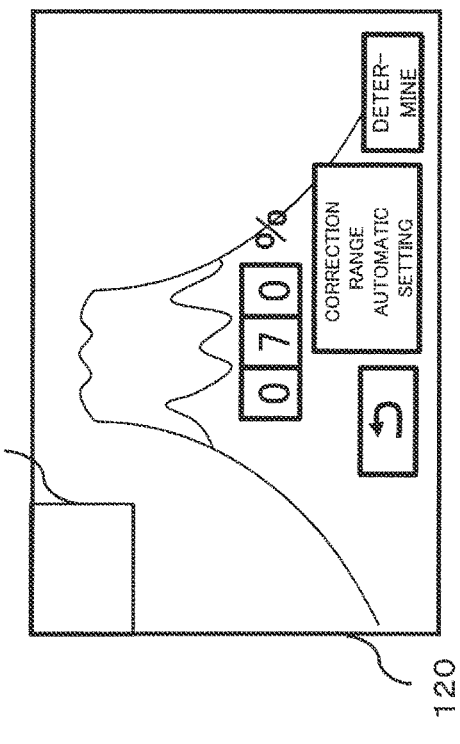

When a touch operation is performed on the determination button Bs on the correction range setting screen of FIG. 9C, the camera controller 140 stores the movable amount limitation rate determined in step S101 into the flash memory 142 as the setting value of the correction range setting (S103). As shown in FIG. 9D, the camera controller 140 displays the shake correction menu screen in which the setting value of the correction range setting is updated on the touch display 120, and terminates the automatic setting process of the correction range. FIG. 9D shows an example of the shake correction menu screen in which the movable amount limitation rate is set to 70%.

Figure 16A:
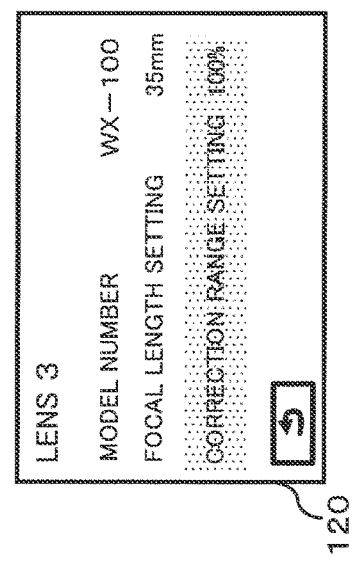
FIGS. 16A to 16D are diagrams illustrating a first example of an old lens registration/selection processing.
Figure 17A:
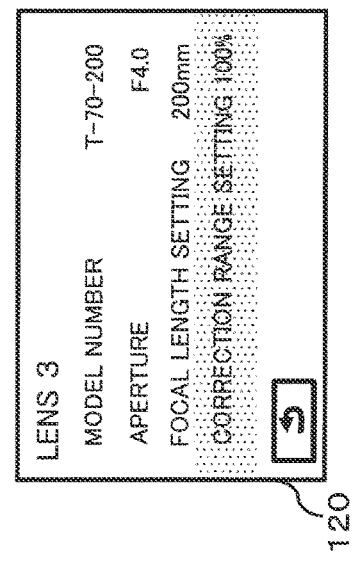

In the method in which the correction range setting screen of FIG. 9A is called from the shake correction menu screen of FIG. 8 and the movable amount limitation rate is detected and registered as described above, the user needs to perform the above series of operations each time when the old lens to be used is changed. In order to reduce this, an old lens whose movable amount limit is detected can be registered in a list format by using an old lens selection screen as shown in FIG. 16A or FIG. 17A. It is also possible to set the movable amount limitation rate by selecting the registered old lens to be used from the old lens selection screen. The details of the processing will be described below, as other examples of old lens registration/selection.

Figure 12:
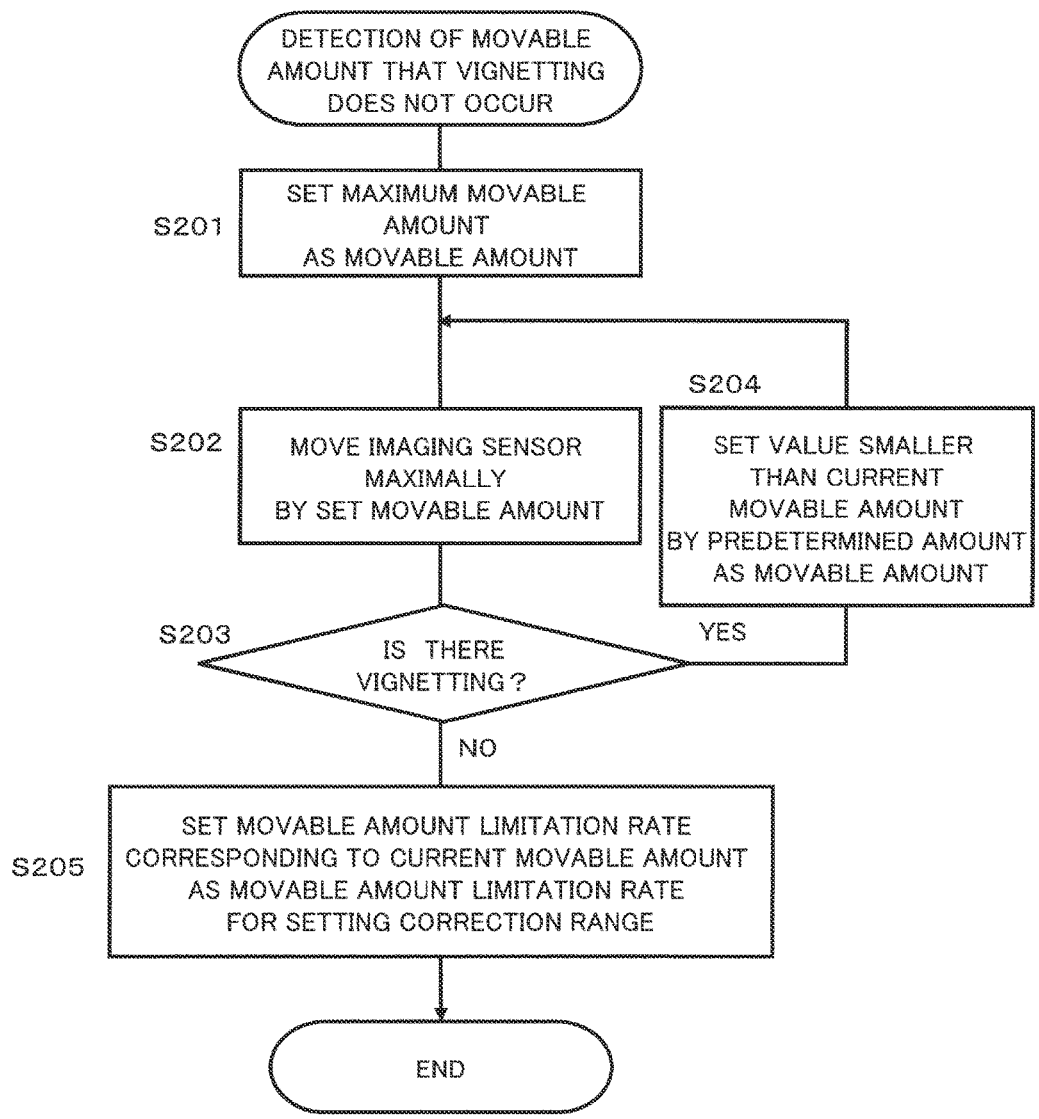
FIG. 12 is a flow chart illustrating details of detection processing of a movable amount and a movable amount limitation rate in which vignetting does not occur.

Next, the details of the detection processing of the movable amount and the movable amount limitation rate in step S101 of FIG. 11 at which the vignetting does not occur will be described. FIG. 12 is a flowchart describing details of the detection processing of the movable amount and the movable amount limitation rate in step S101 of FIG. 11 at which the vignetting does not occur.

The camera controller 140 sets the maximum movable amount as the movable amount (S201).

The camera controller 140 moves the imaging sensor 110 maximally by the set movable amount (S202). For example, at a time immediately after the execution of step S201, the maximum movable amount is set as the movable amount, and the camera controller 140 moves the imaging sensor 110 maximally to the right lower side in the diagonal direction by the maximum movable amount as shown in FIG. 10A.

The camera controller 140 determines whether or not a vignetting exists in the captured image generated by the imaging sensor 110 (S203).

Figure 13A:
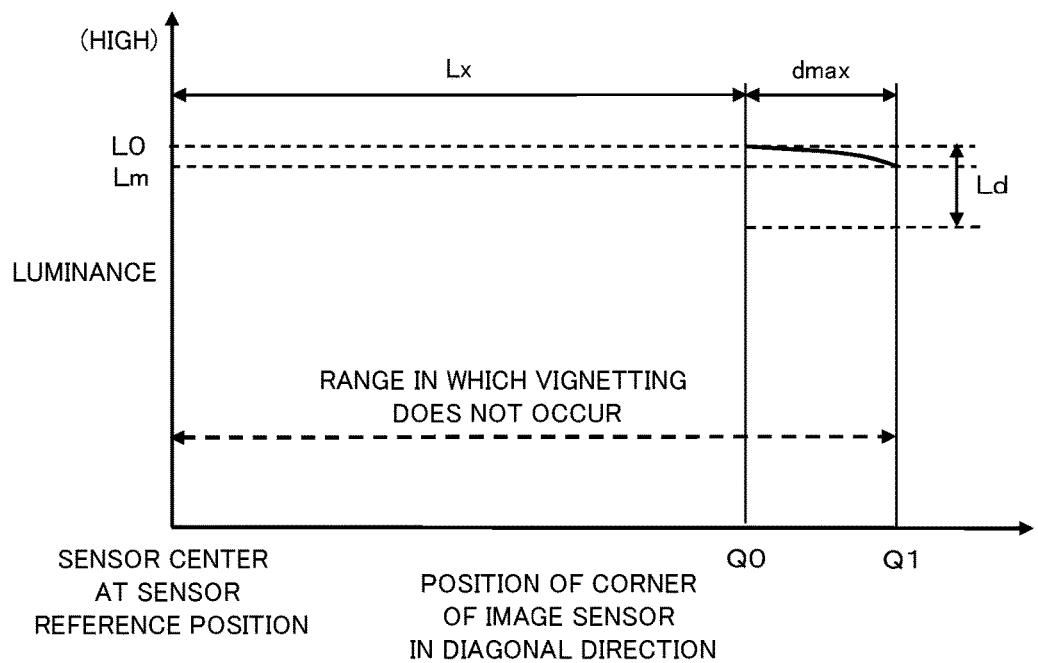
FIGS. 13A and 13B are diagrams illustrating a method for detecting vignetting.
Figure 13B:
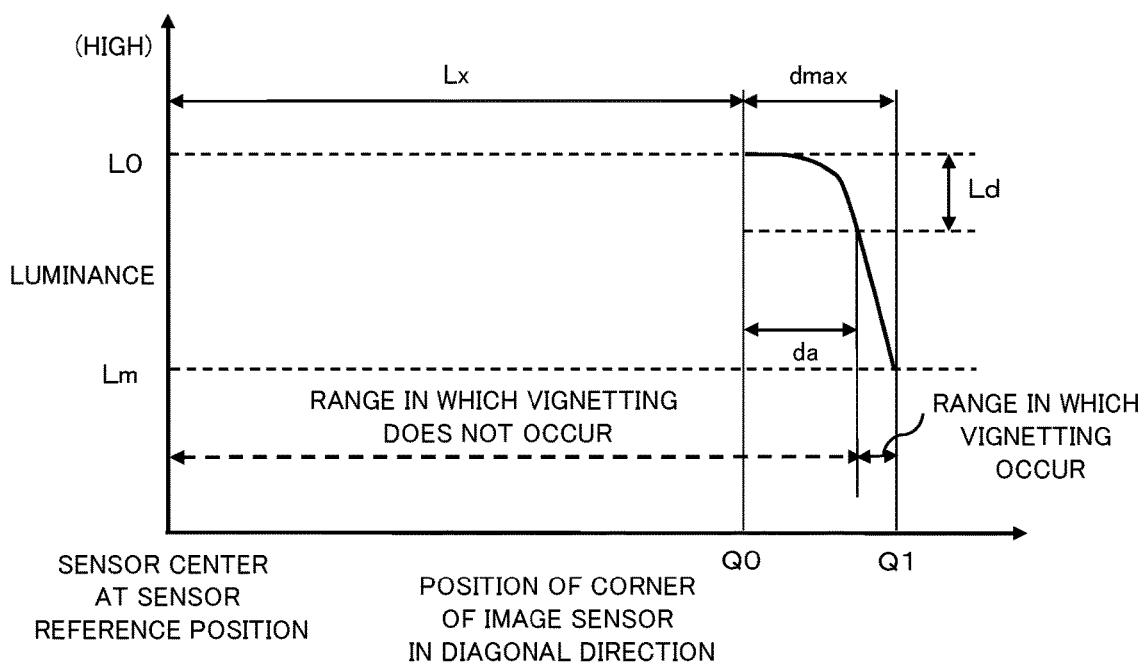

The determination in step S203 will be described with reference to FIGS. 13A and 13B are diagrams illustrating a method of detecting vignetting in step S203. FIG. 13A is a diagram showing luminance indicated by a signal output from a predetermined pixel of the right lower corner of the imaging sensor 110 when the imaging sensor 110 is moved to the right lower side in the diagonal direction while the interchangeable lens 200 designed to fit the camera body 100 is mounted on the camera body 100. FIG. 13B shows the luminance indicated by a signal outputted from a predetermined pixel of the right lower corner portion of the imaging sensor 110 when the imaging sensor 110 is moved to the right lower side in the diagonal direction while the old lens is mounted on the camera body 100. The predetermined pixel of the right lower corner of the imaging sensor 110 may be a plurality of pixels of a right lower corner, and in this case, an average value of luminance indicated by a signal output from a plurality of pixels at a right lower corner is used.

When the imaging sensor 110 is in the sensor reference position (the center position when the imaging sensor 110 is not caused to move), the corner 110a of the imaging sensor 110 is at a position Q0 of the diagonal direction length Lx from the sensor center (an optical axis position of the interchangeable lens 200) at the sensor reference position. At this time, the luminance indicated by the signal output from the predetermined pixel of the corner 110a portion is L0. When the imaging sensor 110 is moved in the diagonal direction, the corner 110a of the imaging sensor 110 positions at a position Q1 where a length is longer than the diagonal direction length Lx. When the imaging sensor 110 is moved in the diagonal direction, the luminance indicated by the signal output from the predetermined pixel of the portion of the corner 110a is Lm. In FIGS. 13A and 13B, Q1 and Lm are the position and luminance of the imaging sensor 110 when the imaging sensor 110 is moved by the maximum movable amount Dmax, but it is one example. In this embodiment, when the luminance difference (L0-Lm) between the luminance L0 when the imaging sensor 110 is at the sensor reference position and the luminance Lm when the imaging sensor 110 is moved in the diagonal direction is larger than the predetermined value Ld, it is determined that the vignetting exists. In addition, the range where the luminance difference (L0-Lm) is larger than the predetermined value Ld is determined to be within a range in which the vignetting is present in the captured image. The predetermined value Ld may be any value that can appropriately determine the presence or absence of vignetting.

As shown in FIG. 13A, even when the imaging sensor 110 is moved maximally by the maximum movable amount Dmax in the diagonal direction, the luminance difference (L0-Lm) is smaller than the predetermined value Ld even when the imaging sensor 110 is moved maximally by the maximum movable amount Dmax in the diagonal direction. Therefore, the interchangeable lens 200 can determine that there is no vignetting in the captured image.

On the other hand, as shown in FIG. 13B, as shown in FIG. 13B, when the imaging sensor 110 is moved by Da or more in the diagonal direction, the luminance difference (L0-Lm) is equal to or greater than a predetermined value Ld. In such a case, it is possible to determine that there is a vignetting in a range in which the luminance difference (L0-Lm) is equal to or greater than the predetermined value Ld in the captured image.

If it is determined that there is a vignetting (YES in S203), the camera controller 140 sets a value smaller than the current movable amount by the predetermined amount as the movable amount (S204). The predetermined amount is, for example, 10% in terms of the movable amount limitation rate. In order to accurately set the movable amount limitation rate according to the range of the vignetting, for example, a value smaller than 10%, such as 1% or 5%, may be used. Then, the camera controller 140 executes the step S202 and the step S203 again.

Specific examples of steps S204, S202 and S203 will be described. If there is a vignetting in step S203 (YES in S203), the camera controller 140 sets the movable amount to a movable amount smaller than the maximum movable amount Dmax in step S204. The movable amount limitation rate corresponding to the movable amount at this time is 90% smaller than 100% when the current movable amount limitation rate is, for example, 100% and the predetermined amount is 10%. Then, as shown in FIG. 10B in step S202, the imaging sensor 110 is moved to the right lower side maximally in the diagonal direction within the limited movable range Ra of the movable amount limitation rate of 90%. Then, the determination of step S203 is performed again. In FIG. 10B, an example in which the size (radius) of the limited movable range Ra is larger than the size (radius) of the image circle C. In this case, the right lower corner 110a of the imaging sensor 110 protrudes out of the image circle C. Therefore, the object light does not reach the vicinity of the right lower corner 110a of the imaging sensor 110 protruding from the image circle C. Therefore, as shown in FIG. 9B, vignetting V remains at the upper left corner of the captured image. Therefore, it is determined again that the vignetting is present in step S203 (YES in S203). If it is determined in step S201 that there is no vignetting (NO in S203), the movable amount is reduced by a predetermined amount in step 204 and the imaging sensor 110 is moved in step S202. Here, the image of FIG. 9B is an example of an image displayed on the touch display 120 during automatic detection of the vignetting, and the live view image Im and the gaze frame Fa are displayed, but the return button, the correction range automatic setting button, the determination button, the numerical window and the movable amount limitation rate are not displayed. By displaying the live view image in the middle of automatic detection of the vignetting, the user can recognize how the vignetting is lost. In the image shown in FIG. 9B, the numerical window and the movable amount limitation rate may be displayed.

When it is determined in step S203 that there is no vignetting (NO in S203), the camera controller 140 calculates a movable amount limitation rate corresponding to the current movable amount, and sets the calculated movable amount limitation rate as a movable amount limitation rate for setting the correction range (S205).

After the execution of step S205, the camera controller 140 executes the processing after the step S102 shown in FIG. 11 on the basis of the determined movable amount limitation rate.

2.1.1 First Other Example of Old Lens Registration/Selection Processing

First other example of old lens registration/selection processing will be described.

Figure 15:
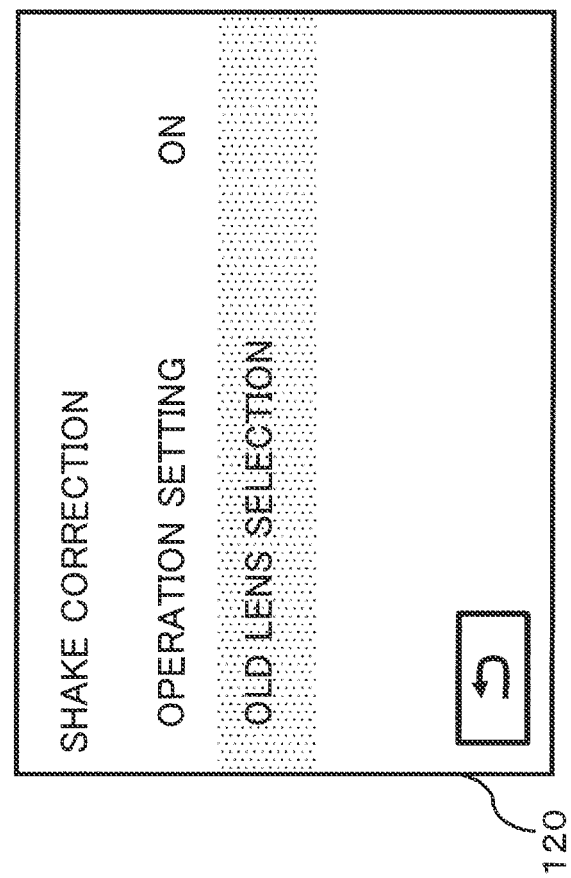
FIG. 15 is a diagram showing other example of a shake correction menu screen.

FIG. 15 is a diagram showing an example of a shake correction menu screen in the case of registering an old lens in a list form. FIGS. 16A to 16D shows a diagram illustrating a first example of an old lens registration/selection processing.

In the shake correction menu screen of FIG. 15, an item of "old lens selection" is provided instead of an item of "focal length setting" and "correction range setting" of the shake correction menu screen of FIG. 8. When a touch operation is performed on the "old lens selection", an old lens selection screen shown in FIG. 16A is displayed.

In the old lens selection screen of FIG. 16A, the model number and the setting value of the correction range setting are displayed in association with each other for each of the old lenses. The model number is manually registered by the user as described later. The model number is an example of the identification information of the interchangeable lens. FIG. 16A shows an example in which two old lenses of the lens 1 and the lens 2 are registered. In the lens 1, "AB1-50" is registered as the model number and "90%" is registered as the setting value of the correction range setting. In the lens 2, "CX-35" is registered as the model number and "80%" is registered as the setting value of the correction range setting. FIG. 16A shows an example of the old lens selection screen in which a touch operation by a user is performed at a lower part of an item of the lens in order to register a new old lens and a shading is overlaid.

Figure 16B:
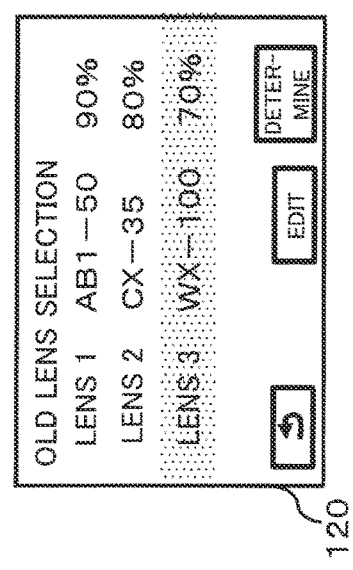

When a touch operation is performed on the edit button in the display state of FIG. 16A, the camera controller 140 displays a lens registration screen for the lens 3 as shown in FIG. 16B on the touch display 120.

Items of "model number", "focal length setting", and "correction range setting" are displayed on the lens registration screen. In the initial state in which the lens registration screen of the lens 3 is displayed first, the contents of "model number" and "focal length setting" are blank and not displayed, and "100%" of the initial value of the movable amount limitation rate is displayed with respect to the "correction range setting". When a touch operation is performed on the "model number" in the lens registration screen of the initial state, for example, a keyboard is displayed, and the user can input the model number. FIG. 16B shows an example in which the model number "WX-100" is input. When a touch operation is performed on the "focal length setting", the focal length of the interchangeable lens can be newly set or selected from a plurality of options. FIG. 16B shows an example in which "35 mm" is set. When the touch operation is performed on the "correction range setting", the correction range setting screen of FIG. 9A is displayed on the touch display 120.

Figure 16C:
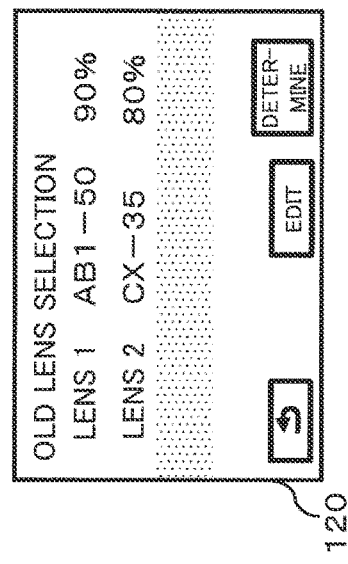
Figure 16D:
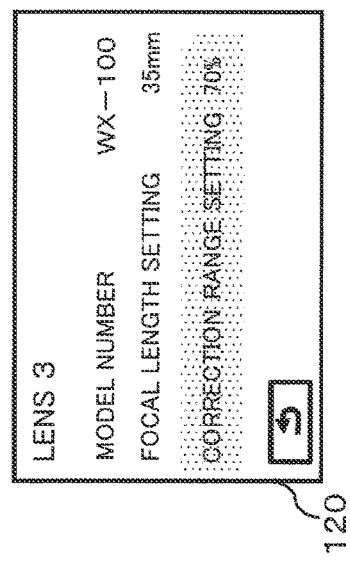

When a touch operation is performed on the correction range automatic setting button Bd in the correction range setting screen of FIG. 9A, the camera controller 140 detects the movable amount limitation rate according to the flowchart of FIG. 11 (S101). As shown in FIG. 9C, the camera controller 140 updates the correction range setting screen based on the live view image (captured image) when the imaging sensor 110 is moved by the detected movable amount limitation rate (S102). When a touch operation is performed on the determination button Bs on the correction range setting screen of FIG. 9C, the camera controller 140 updates the lens registration screen for the lens 3 based on the movable amount limitation rate detected in step S101, for example, as shown in FIG. 16C. At this time, the camera controller 140 associates the model number the focal length setting, and the setting value of the correction range setting (movable amount limitation rate) set on the lens registration screen of the lens 3, with the lens 3, and stores it into the flash memory 142 (S103). When a touch operation is performed on the return button in the lens registration screen of FIG. 16C, the camera controller 140 displays an old lens selection screen including the model number the setting value of the correction range setting (movable amount limit), of the lens 3 registered on the lens registration screen, as shown in FIG. 16D. Thus, the user can confirm that the registration of the lens 3 has been completed.

Thereafter, if the user wants to use the registered old lens at another opportunity, the user cause the digital camera 1 to display the old lens selection screen via the shake correction menu screen of FIG. 15 in the above-described procedure. At this time, for example, an old lens selection screen as shown in FIG. 16D is displayed. When the lens 2 is desired to be used, the user performs a touch operation on the lens 2. Then, the shading indicating that the lens 2 is currently selected is shifted to the lens 2. In that state, when the user performs a touch operation on the determination button, the selection of the lens 2 is determined, and "80%" which is the setting value of the correction range setting of the lens 2 is set as the movable amount limitation rate in BIS control. Although each of FIGS. 16A to 16D shows an example in which the model number of the lens is registered, an arbitrary lens name or the like desired by the user may be registered when the setting value of the correction range setting described later is not communicated with the external.

By providing a list type of old lens selection screen as described above, in the case where the user has a plurality of old lenses (interchangeable lenses), it becomes possible to easily set a setting value of the correction range setting according to the old lens to be used from the old lens selection screen, and causes the digital camera 1 to perform the BIS control according to the old lens to be used. This configuration can also provide the following effects. That is, even when the focal length is the same and the mount type is the same, a size (radius) of the image circle may be different due to a difference in the design concept of the old lens in a case that the lens model number is different. Even in such a case, this configuration allows the user to easily set an optimum correction range for each old lens by storing a setting value (movable amount limitation rate) of the correction range setting in association with the lens model number.

2.1.2 Second Other Example of Old Lens Registration/Selection Processing

A second other example of the old lens registration/selection processing will be described. In a zoom lens, when the focal length is changed, the size (radius) of the image circle sometimes changes. Also, the size (radius) of the image circle sometimes changes not apply only to the zoom lens, when the size of the aperture is changed by restricting the aperture 260. In view of this, the "aperture" can be further registered in the old lens registration screen, and further the "aperture" and the "focal length" may be displayed on the old lens selection screen. The aperture value and the focal length are examples of photographing conditions set for the interchangeable lens.

When a touch operation is performed on the "old lens selection" on the hand-shake correction menu screen of FIG. 15, an old lens selection screen shown in FIG. 17A is displayed.

In the old lens selection screen shown in FIG. 17A, the lens model number, the aperture value, the focal length, and the setting value of the correction range setting are displayed in association (in combination) for each of the old lenses. The lens model number, the aperture value, and the focal length are manually registered by the user as described later.

FIG. 17A shows an example in which two old lenses of the lens 1 and the lens 2 are registered. As to the lens 1, "STM-35-70" is registered as the lens model number is, "F3.5" is registered as the aperture value, "35 mm" is registered as the focal length, and "80%" is registered as the setting value of the correction range setting. As to the lens 2, "STM-35-70" is registered as the lens model number, "F5.6" is registered as the aperture value, "70 mm" is registered as the focal length, and "90%" is registered as the setting value of the correction range setting. FIG. 17A shows an example of the old lens selection screen in which a touch operation is performed on the lower part of the item of the lens 2 in order to register a new old lens and a shading is overlaid. The data of the lens 1 and the lens 2 are data of one lens possessed by the user, as can be seen from the fact that the lens model numbers are same each other, each the movable amount limitation rate (setting value of correction range setting) of the data being obtained in condition in which the aperture value and the focal length are different each other.

When a touch operation is performed on the edit button in the display state of FIG. 17A, the camera controller 140 causes the touch display 120 to display a lens registration screen for the lens 3 as shown in FIG. 17B.

Items of "model number", "aperture", "focal length setting", and "correction range setting" are displayed on the lens registration screen, and a return button is displayed. In the initial state in which the lens registration screen of the lens 3 is displayed first, the contents of "model number", "aperture" and "focal length setting" are blank and not displayed, and "100%" of the initial value of the movable amount limitation rate is displayed with respect to the "correction range setting". When a touch operation is performed on the "model number" in the lens registration screen of the initial state, a keyboard is displayed for example and the user can input the model number. FIG. 17B shows an example in which the model number "T-70-20" is input. When a touch operation is performed on the "aperture", an aperture of the interchangeable lens can be newly set or selected from a plurality of options. In FIG. 17B shows an example in which "F4.0" is set. When a touch operation is performed on the "focal length setting", the focal length of the interchangeable lens can be newly set or selected from a plurality of options. FIG. 17B shows an example in which "200 mm" is set. When the touch operation is performed on the "correction range setting", the correction range setting screen of FIG. 9A described before is displayed on the touch display 120.

Figure 17C:
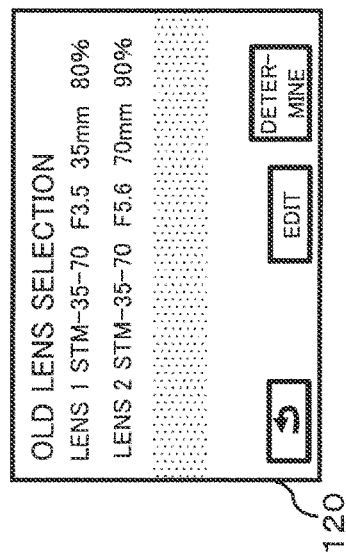
Figure 17D:
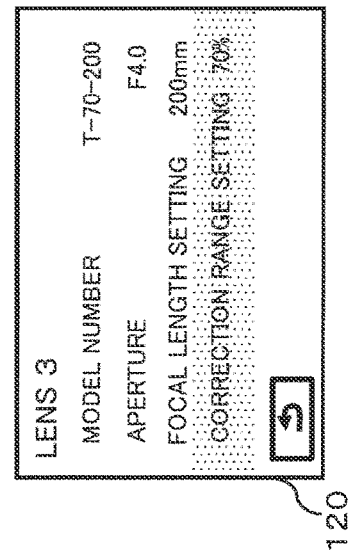

When a touch operation is performed on the correction range automatic setting button in the correction range setting screen of FIG. 9A, the camera controller 140 detects the movable amount limitation rate in accordance with the flowchart of FIG. 11 (S101). As shown in FIG. 9C, the camera controller 140 updates the correction range setting screen based on the live view image (captured image) when the imaging sensor 110 is moved based on the detected movable amount limitation rate (S102). When a touch operation is performed on the determination button on the correction range setting screen of FIG. 9C, the camera controller 140 updates the lens registration screen for the lens 3 based on the movable amount limitation rate detected in step S101, for example, as shown in FIG. 17C. At this time, the camera controller 140 stores the model number, aperture, focal length setting, and correction range setting value set on the lens registration screen of the lens 3 in association with the lens 3 into the flash memory 142 (S103). When a touch operation is performed on the return button in the lens registration screen of FIG. 17C, the camera controller 140 displays an old lens selection screen including information on the model number, aperture, focal length setting, and correction range setting of the lens 3 registered on the lens registration screen as shown in FIG. 17D. Thus, the user can confirm that the registration of the lens 3 has been completed.

Thereafter, if the user wants to use the registered old lens at another opportunity, the user cause the digital camera 1 to display the old lens selection screen via the shake correction menu screen of FIG. 15 in the above-described procedure. At this time, for example, an old lens selection screen as shown in FIG. 17D is displayed. When the lens 2 is desired to be used, the user performs a touch operation on the lens 2. Then, the shading indicating that the lens 2 is currently selected is shifted to the lens 2. In that state, when the user performs a touch operation on the determination button, the selection of the lens 2 is determined, and "90%" which is the setting value (movable amount limit) of the correction range setting of the lens 2 is set as the movable amount limitation rate in BIS control. Although each of FIGS. 17A to 17D shows an example in which the model number of the lens is registered, an arbitrary lens name or the like desired by the user may be registered when the setting value of the correction range setting described later is not communicated with the external.

By providing a list type of old lens selection screen including the photographing condition (the aperture value and the focal length) as described above, in the case where the user has a plurality of old lenses (interchangeable lenses), the setting value of the correction range setting can be registered for each combination of the model number of the old lens and the photographing condition (the aperture value and the focal length), in addition to the effects described in the first other example. Further, it becomes possible to easily select the combination to be used from the old lens selection screen, and causes the camera body 100 to perform BIS control corresponding to the combination to be used.

2.2 Shake Correction Process in Digital Camera

In the digital camera 1, as described above, image blur on the imaging sensor 110 due to camera shake is canceled by driving the imaging sensor 110 based on a detected shake amount. At that time, when a size (radius) of a drive range of the imaging sensor 110 calculated based on the detected shake amount is larger than a size (radius) of the limited movable range Ra, a movement amount of the imaging sensor 110 is limited so that the imaging sensor 110 does not move beyond the limited movable range Ra. The shake correction process will be described with reference to the flowchart of FIG. 14.

Figure 14:
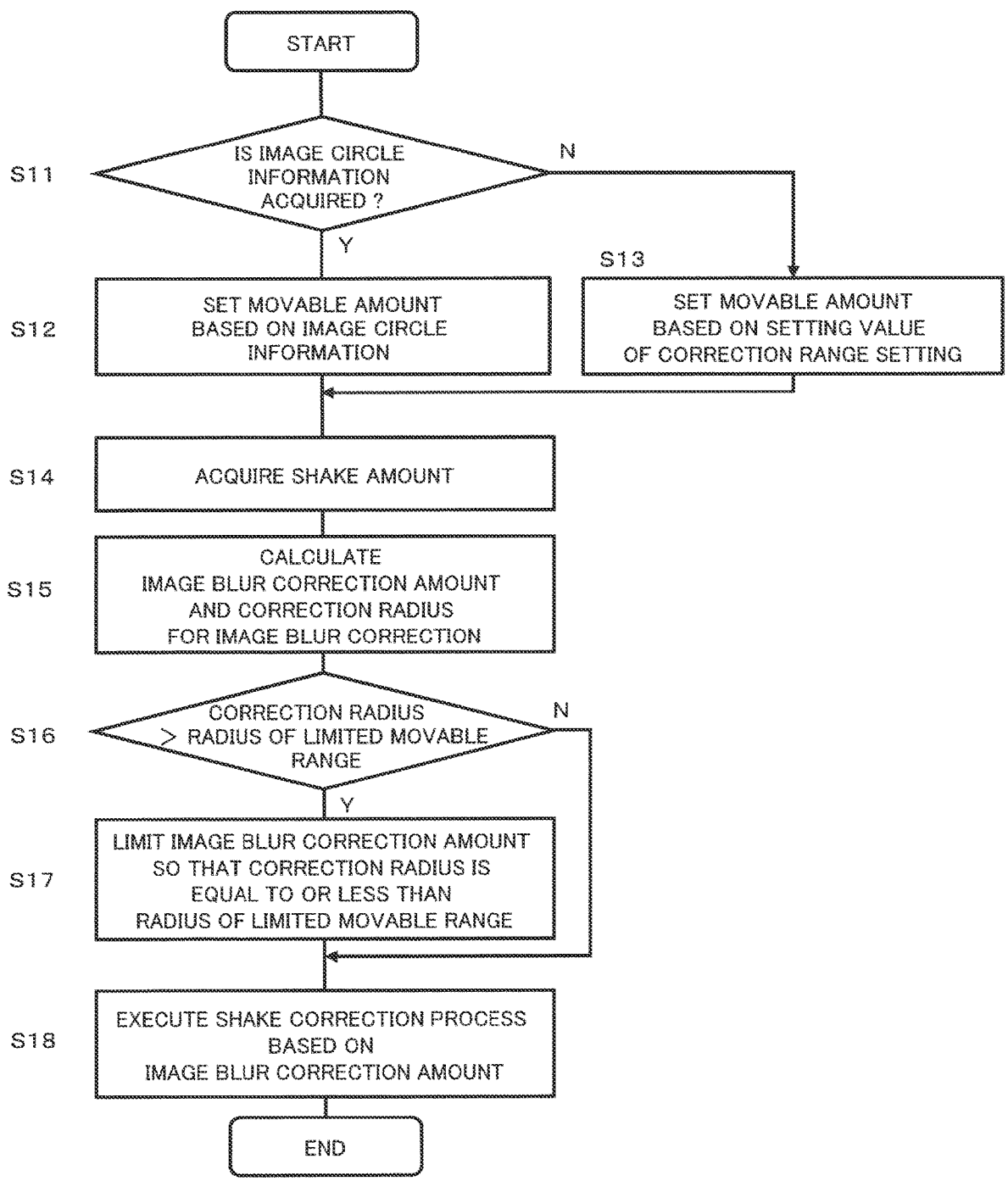
FIG. 14 is a flowchart illustrating shake correction process.

FIG. 14 is a flowchart regarding the shake correction process in the digital camera 1. This process is executed when the user presses a release button (instructs capturing).

The camera controller 140 determines whether or not image circle information of the interchangeable lens is acquired (S11).

When the image circle information of the interchangeable lens is acquired (YES in S11), the camera controller 140 sets a size (radius) of the limited movable range Ra based on the acquired image circle information (S12).

On the other hand, if the image circle information of the interchangeable lens cannot be acquired (NO in S11), the camera controller 140 sets the size (radius) of the limited movable range Ra based on the movable amount limitation rate set on the correction range setting screen (if there is no selection/registration of the old lens), or based on the movable amount limitation rate set on the old lens selection screen (if there is selection/registration of the old lens) (S13).

The camera controller 140 acquires a shake amount (output of the integrator 408) from the BIS processor 183 (S14), and calculates an image blur correction amount (sensor movement amount) of the imaging sensor 110 required to cancel image blur on the imaging surface, based on the acquired shake amount (S15). Specifically, the camera controller 140 calculates a distance (correction radius) from a center position of the imaging sensor 110 at the time when the BIS function is not activated (when the imaging sensor 110 is at the sensor reference position), to a corner on a moving direction side of the imaging sensor 110 at the time when the BIS is activated and the imaging sensor 110 is moved by the image blur correction amount. For example, when it is necessary to move the imaging sensor 110 in the diagonal direction by an image blur correction amount a in order to cancel image blur, the distance (correction radius) is a diagonal length of the imaging sensor+α.

The camera controller 140 compares the correction radius with the radius of the limited movable range Ra, to determine whether or not the correction radius is larger than the radius of the limited movable range Ra (S16).

When the correction radius is larger than the radius of the limited movable range Ra (YES in S16), the camera controller 140 limits (reduces) the image blur correction amount so that the correction radius is equal to or less than the radius of the limited movable range Ra (S17).

On the other hand, when the correction radius is equal to or smaller than the radius of the limited movable range Ra (NO in S16), the camera controller 140 executes the shake correction process based on the image blur correction amount calculated based on the shake amount detected in step S15 (S18).

2.3 External Input/Output of Correction Range Setting Data

The digital camera 1 of the present embodiment has a function of externally inputting and outputting setting value data of correction range setting (hereinafter referred to as "correction range setting data" as appropriate) that is set as described above. Specifically, the digital camera 1 has a function of transmitting and receiving correction range setting data through the memory card 171 or the network, between with a third-party digital camera having a function similar to that of the digital camera 1 of the present embodiment. The memory card 171 may be any card such as an SD card or an XQD (registered trademark) card.

For example, in a case of through the memory card 171, when the user performs a predetermined operation such as selection from a menu or an with a shortcut key, the camera controller 140 outputs correction range setting data of the old lens stored in the flash memory 142 to the memory card 171 in a predetermined list format. FIG. 18 is a view showing an example of a list of correction range setting data to be outputted. The list of correction range setting data associates and records a lens model number and a setting value of the correction range setting for each old lens. When the memory card 171 storing the list of FIG. 18 is inserted into the card slot 170 of the digital camera 1 possessed by a third party, and a predetermined user operation such as selection from a menu or an with a shortcut key is performed, the camera controller 140 of the third-party digital camera 1 reads the correction range setting data recorded on the memory card 171, and records the correction range setting data into the flash memory 142. Thereafter, when a user operation for displaying the old lens selection screen is performed on the third-party digital camera 1, the camera controller 140 of the third-party digital camera 1 displays an old lens selection screen including the old lenses registered in the list of FIG. 18. When the correction range setting data for another old lens is registered earlier in the flash memory 142 of the third-party digital camera 1, an old lens selection screen is displayed in which both the old lens registered earlier and the old lens read from the flash memory 142 this time are displayed in the list. As described above, according to the digital camera 1 of the present embodiment, it is possible to use the correction range setting data for the setting value of the correction range setting that is set by other user between the plurality of digital cameras 1. Note that this example shows a case of through the memory card 171, but an external USB interface may be provided in the digital camera 1, and a USB memory connected to the external USB interface or the like may be used similarly to the SD card.

Figure 19:
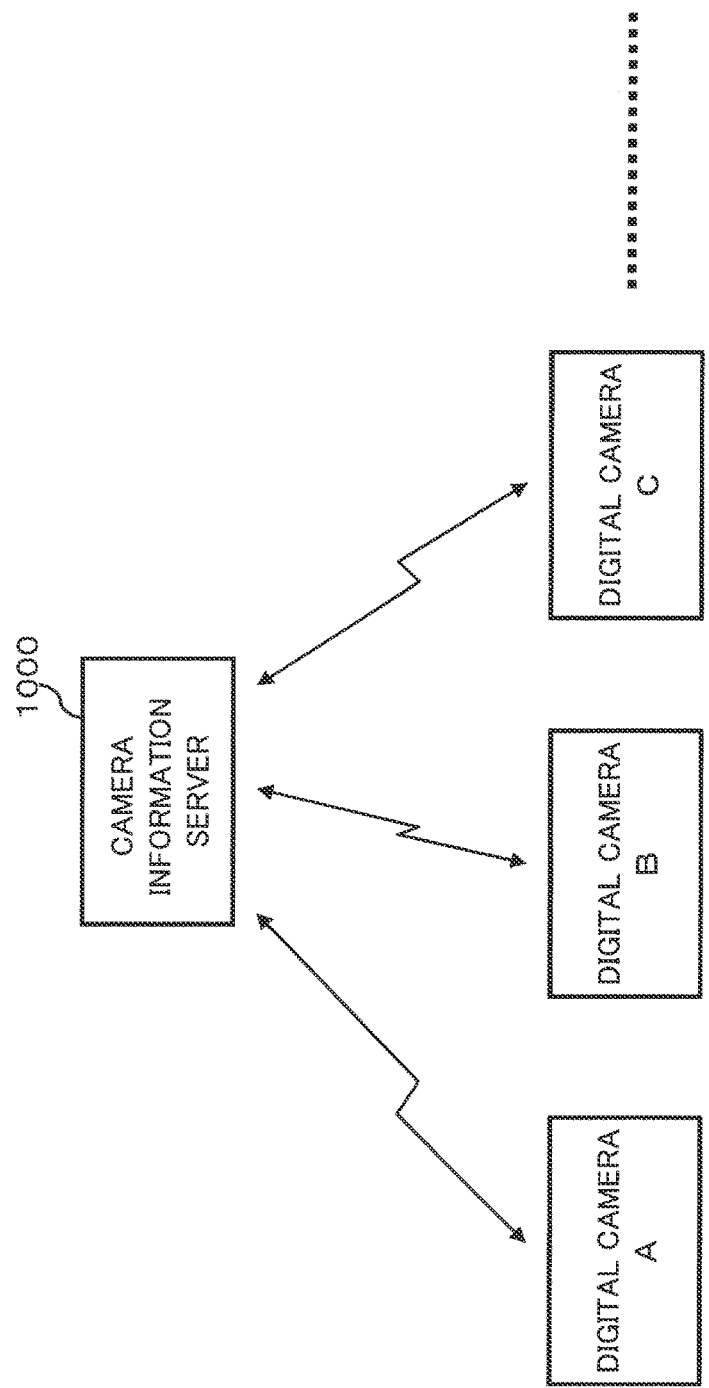
FIG. 19 is a block diagram of a system for providing correction range setting data through a network.

On the other hand, in a case of through a network, a configuration is as follows. FIG. 19 is a configuration diagram of a system for providing correction range setting data through a network. FIG. 20 is a view showing a configuration of a master data list for correction range setting data. The system for providing correction range setting data includes a camera information server 1000. The camera information server 1000 stores the master data list shown in FIG. 20. The master data list associates and records a lens model number and a setting value of the correction range setting for each old lens. The master data list is stored in the same format as the list of correction range setting data outputted to the memory card. Digital cameras A, B, C . . . have a network communication function and can upload the list of correction range setting data as shown in FIG. 18 to the camera information server 1000 through the network. When the list of correction range setting data is uploaded from any of the digital cameras A, B, C . . . , the camera information server 1000 fetches and stores the uploaded list of correction range setting data in the master data list. When one of the digital cameras A, B, C . . . requests for acquiring a master data list through the network, the camera information server 1000 transmits the master data list to the requesting digital camera. Such a providing system makes it possible to, when the user newly acquires the old lens, acquire and use the setting value of the correction range setting set by another user from the camera information server 1000 through the network. Note that, when the user downloads the master data list to the digital camera 1, the correction range setting data of the old lens required by the user may be exclusively selected and stored in the digital camera among the correction range setting data for the plurality of old lenses included in the master data list. Further, the camera information server 1000 may perform authentication so that a previously registered user who possesses the digital camera 1 can exclusively access. This can appropriately ensure the reliability of the correction range setting data.

Effect

As described above, the camera body 100 (an example of an imaging apparatus) according to the present embodiment comprises: an imaging sensor 110 that captures an object image formed through an interchangeable lens to generate image data; a driver 181 (an example of a driver) that performs image blur correction by moving the imaging sensor 110 in a plane perpendicular to an optical axis; and a camera controller 140 (an example of a controller) that causes the driver 181 to move the imaging sensor 110. The controller 140 causes the driver 181 to move the imaging sensor 110 automatically, thereby detecting a movable amount of the imaging sensor 110 that does not cause a vignetting in the captured image at a time when moving the imaging sensor 110 for image blur correction, and causes the driver to move the imaging sensor within a range of the detected movable amount.

With this, when the imaging sensor 110 is moved for image blur correction, the movable amount of the imaging sensor 110 which does not generate vignetting in the captured image can be automatically detected, and the imaging sensor 110 can be driven within the range of the movable amount. Therefore, it is possible to suppress the occurrence of vignetting in the captured image.

The camera controller 140 detects the movable amount of the imaging sensor 110 which does not generate vignetting, when the camera controller 140 cannot acquire information indicating the size of the image circle from the interchangeable lens. With this, even when the information indicating the size of the image circle cannot be acquired from the interchangeable lens, it is possible to appropriately suppress the occurrence of vignetting in the captured image.

The camera controller 140 moves the imaging sensor 110 maximally by the maximum movable amount with a sensor reference position as a reference, to determine whether there is a vignetting in the captured image indicated by the image data generated by the imaging sensor 110 at a position where the imaging sensor 110 is moved maximally. When there is a vignetting, until it is determined that there is no vignetting, the camera controller 140 repeatedly makes the movable amount of the imaging sensor 110 smaller than the current movable amount and moves the imaging sensor 110 maximally by the smaller movable amount with a sensor reference position as a reference, to determine whether there is a vignetting in the captured image indicated by the image data generated by the imaging sensor 110 at a position where the imaging sensor 110 is moved maximally. The camera controller 140 defines the movable amount when it is determined that there is no vignetting as a movable amount that does not cause vignetting in the captured image.

The camera controller 140 determines whether or not vignetting occurs in the captured image based on the luminance difference between the luminance indicated by the signal output from a predetermined pixel of the corner 110a portion of the imaging sensor 110 when the imaging sensor 110 is at the sensor reference position and the luminance indicated by the signal output from the predetermined pixel when the imaging sensor 110 is moved. With this, it is possible to appropriately detect whether or not vignetting occurs in the captured image based on the luminance difference.

The camera body 100 in the second other example of the registration/selection processing includes: a touch display 120 (an example of an operation unit) that accepts a user operation; a flash memory 142 (an example of a storage unit); and a touch display 120 (an example of a display unit) for displaying an image. The camera controller 140 stores the detected movable amount limitation rate (an example of the numerical value relating to the movable amount) into the flash memory 142 (an example of a storage unit) in association with a combination (lens 1, lens 2, lens 3, and so on) of a model number (an example of identification information) of the interchangeable lens registered based on the user operation (for example, a touch operation in the old lens registration screen) to the touch display 120 and the imaging condition (for example, a aperture value or a focal length) set for the interchangeable lens when the movable amount is detected. When the touch display 120 receives a user operation (for example, a touch operation to the old lens selection on the shake correction menu screen) for causing the touch display 120 to display an old lens selection screen (an example of a selection screen displaying all of the registered combinations), the camera controller 140 reads all of the combinations registered from the flash memory 142 (an example of a storage unit) and displays the old lens selection screen on the touch display 120. When the touch display 120 receives a user operation (for example a touch operation to an item of one lens and a touch operation to a determination button thereafter) for selecting one combination from the combinations displayed on the selection screen, the camera controller 140 causes the driver 180 to move the imaging sensor 110 within the range of the movable amount indicated by the numerical value relating to the movable amount associated with the selected one combination. With this, the user can easily set a movable amount suitable for the photographing condition when using an interchangeable lens such as an old lens to obtain a captured image without vignetting.

Second Embodiment

The digital camera of the second embodiment will be described. As described in the first embodiment, in the zoom lens, when the focal length is changed, the size (radius) of the image circle sometimes changes. Also, the size (radius) of the image circle sometimes changes not apply only to the zoom lens, when the size of the aperture is changed by restricting the aperture 260. There is a case in which the camera body 100 cannot acquire image circle information by communication from the interchangeable lens (zoom lens), but can control the aperture value and the focal length of the interchangeable lens (zoom lens) by communication. In this embodiment, a correction range setting process when such an interchangeable lens (zoom lens) is mounted will be described.

FIG. 21 is a table showing a predetermined combination of an aperture value, a focal length, and a correction range in the interchangeable lens as described above. The table of FIG. 21 is created in the middle of the correction range setting process in this embodiment. In the interchangeable lens of FIG. 21, the focal length is continuously variable between 35 mm and 70 mm for example, and the aperture value F is varied stepwise, in 20 steps for example between F3.5 and F1.8. In this case, the combination of the aperture value and the focal length exists infinitely, but the camera controller 140 detects (measures) the correction range (movable amount limitation rate) for one or more predetermined combinations of the infinite combinations. Then, the camera controller 140 sets a correction range (movable amount limitation rate) of the smallest value among the detected correction range (movable amount limitation rate) to a correction range (movable amount limitation rate) of the interchangeable lens. The predetermined combination may be, for example, a combination of a plurality of combinations of an aperture value and a focal length in which an indicator is displayed on the outer surface of the lens barrel. In the example of FIG. 21, the indicator is given to F3.5, F5.6 and F11 of the aperture value, and an indicator is given to 35 mm, 50 mm, and 70 mm of the focal length. When the aperture value is F3.5 and the focal length is 35 mm, the correction range (movable amount limitation) is the smallest at 80%. The camera controller 140 sets this 80% to the correction range (movable amount limitation) of the interchangeable lens. Then, the correction range (movable amount limitation rate) can be registered and selected using the old lens selection screen in the same manner as in the first embodiment.

Figure 22:
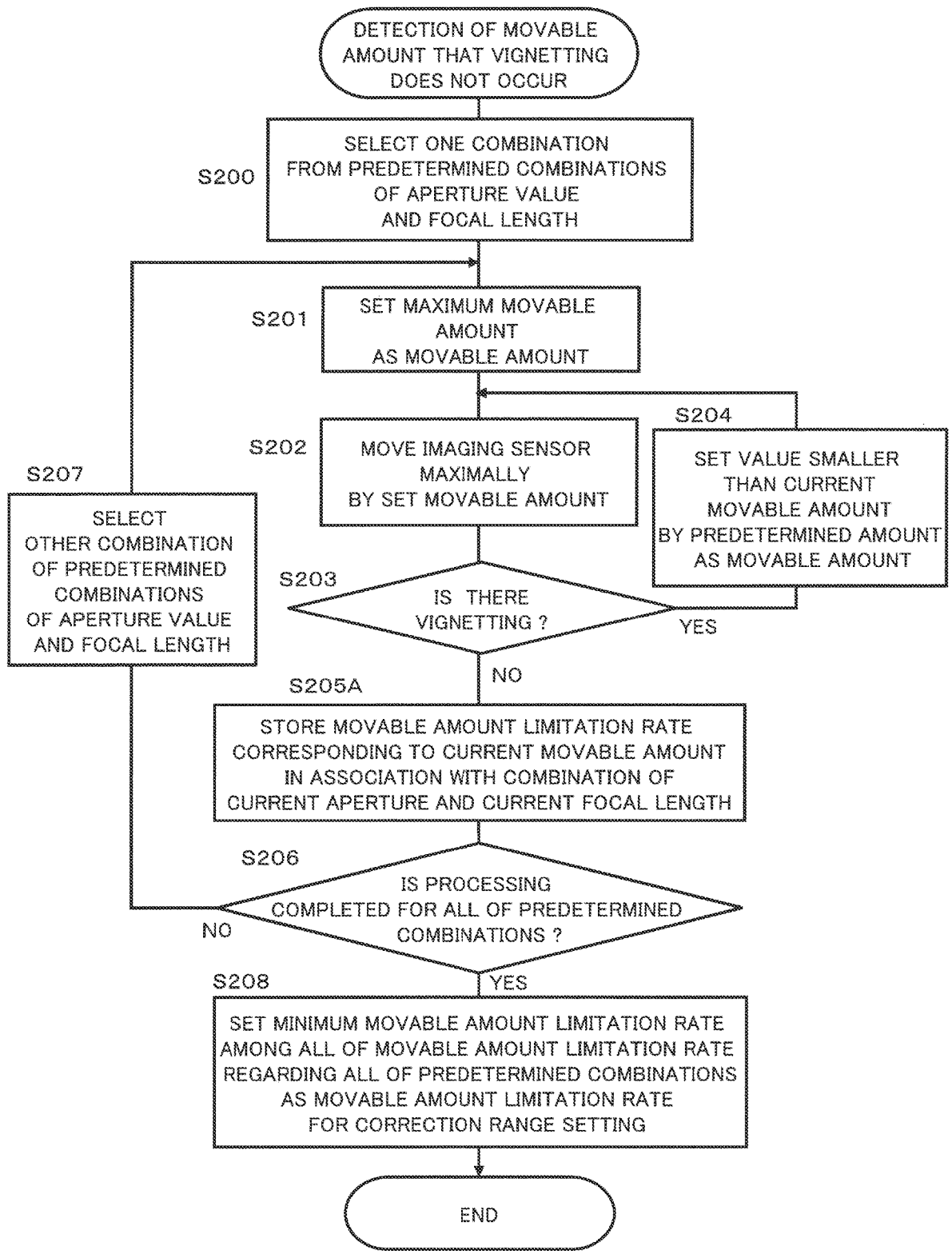
FIG. 22 is a flowchart illustrating a detection processing of a movable amount and a movable amount limitation rate in which vignetting does not occur.

The automatic setting process of the correction range in the present embodiment is performed based on the flowchart of FIG. 11 basically in the same manner as in the first embodiment, but the content of the detection processing of the movable amount in which the vignetting does not occur in the step S101 is different. FIG. 22 is a flowchart showing a flow of detection processing of a movable amount and a movable amount limitation rate in which the vignetting is not generated, the detection processing being executed in step S101 in the present embodiment. In the flowchart of FIG. 22, steps S200, S206 to S208 are added to the flowchart of FIG. 12 of the first embodiment, and in place of step S205, a step S205A is provided.

The camera controller 140 selects one combination from the predetermined combinations of the aperture value and the focal length (S200). For example, in the example of FIG. 21, a combination of the aperture value F3.5 and the focal length 35 mm is selected.

The camera controller 140 executes steps S201 to S204 for the selected combination. That is, when it is determined in step S201 that there is no vignetting (NO in S203), the movable amount is reduced by a predetermined amount in step S204 and the imaging sensor 110 is moved in step S202.

When it is determined that there is no vignetting (NO in S203), the camera controller 140 obtains a movable amount limitation rate corresponding to the current movable amount, and associates the determined movable amount limitation rate with a combination of the current aperture and the current focal length to store it into the flash memory 142 (S205A).

The camera controller 140 determines whether or not the processing of steps S200 to S205 is completed for all of the predetermined combinations (S206).

If the processing for all of the predetermined combinations is not completed (NO in S206), the camera controller 140 selects other combination of the predetermined combination of the aperture and the focal length (S207), and executes the processing after step S201 for the selected combination. For example, in FIG. 21, when the current combination is a combination of the aperture value F3.5 and the focal length 35 mm, a combination of the next aperture value F3.5 and the focal length 50 mm is selected. The order of selection may be arbitrary.

In all of the predetermined combinations (YES in S206), the camera controller 140 sets the minimum (one) movable amount limitation rate as the movable amount limitation rate for setting the correction range for the interchangeable lens which is currently mounted (S208), the minimum (one) movable amount limitation rate being the minimum movable amount limitation rate among all of the movable amount limitation rate regarding all of the predetermined combinations stored in the flash memory 142 as shown in FIG. 21 for example.

After execution of step S208 (after execution of step S101), the camera controller 140 executes the processing of step S102 of FIG. 11 in the same manner as in the first embodiment. Specifically, the camera controller 140 updates the correction range setting screen based on the live view image (captured image) when the imaging sensor 110 is moved by the movable amount limitation determined based on the detection result of the vignetting in step S101 (S102). The camera controller 140 stores the movable amount limitation rate determined in step S101 (S208) in the flash memory 142 as the setting value of the correction range setting (S105), and terminates the automatic setting process of the correction range.

Note that, in this embodiment, the registration/selection processing may be performed in a list form in the same manner as the first and second other examples of the registration/selection processing in the first embodiment. In this embodiment, it is assumed that the image circle information of the interchangeable lens cannot be acquired by communication, but it is possible to control the aperture value and the focal length of the interchangeable lens by communication. Therefore, since the camera controller 140 can recognize the aperture value and the focal length in the minimum movable amount, the aperture value and the focal length may be automatically displayed on the old lens registration screen of FIG. 17B. Further, when the model number of the lens can be acquired by communication, the acquired model number may be automatically displayed. Thus, the user operation for registering the old lens is reduced as compared with the second other example in the first embodiment.

In the present embodiment, when the movable amount is detected, the correction range (movable amount limitation rate)) is temporarily stored in a table as shown in FIG. 21. By using this, not only the setting value (movable amount limitation rate) of the correction range of one combination of the predetermined combinations but also the setting value (movable amount limitation rate) of each correction range for all of the predetermined combinations can be registered in the list form, and it may be possible to select the old lens by using the old lens selection screen as shown in FIG. 17D.

As described above, in the camera body 100 of the present embodiment, when the camera controller 140 can change the photographing condition of the interchangeable lens, the camera controller 140 executes detection of a movable amount in which vignetting does not occur, a plurality of times, while changing the photographing condition, and sets the smallest movable amount among the movable amounts detected in a plurality of times, as a movable amount for the interchangeable lens. Thus, the imaging sensor 110 is driven by the smallest movable amount. Therefore, the occurrence of vignetting can be reliably suppressed.

Other Embodiments

The idea of the embodiments above is not limited to the embodiments described above. Various embodiments may be considered. Hereinafter, other embodiments to which the idea of the embodiments above can be applied will be described.

Each of the above-described embodiments shows an example of suppressing vignetting that may occur when the interchangeable lens alone is attached to the camera body 100. However, the present disclosure can exhibit similar effects in other cases as well. For example, when a hood or filter is attached to a tip of the interchangeable lens, the hood or the filter may enter the image circle of the interchangeable lens, and the image circle of the interchangeable lens may be substantially narrow. However, the camera body 100 is not able to recognize that the hood or the filter is attached to the interchangeable lens. Further, also when an interchangeable lens is attached to the camera body 100 via a tele conversion lens or a wide conversion lens, the image circle of the interchangeable lens may be substantially narrowed under an influence of an optical system of these conversion lenses. In this case, since the conversion lens is interposed between the interchangeable lens and the camera body 100, the camera body 100 is not able to communicate with the interchangeable lens and not able to acquire image circle information of the interchangeable lens. However, also in these cases, the present embodiment allows a movable amount of the imaging sensor 110 to be appropriately reduced by a user selecting correction range setting from the shake correction menu screen or the old lens registration screen and automatically setting the correction range. Therefore, it is possible to suppress occurrence of vignetting when the imaging sensor 110 is driven for shake correction.

In the above embodiments, the camera controller 140 displays the correction range setting screen on the touch display 120 when the user selects "correction range setting" on the shake correction menu screen or the old lens registration screen, but the display timing of the correction range setting screen is not limited to this. For example, the camera controller 140 may automatically display the correction range setting screen on the touch display 120, when communication with the interchangeable lens is not possible even if the power of the camera body 100 is turned on by a user operation. Further, the camera controller 140 may automatically display the correction range setting screen on the touch display 120, when communication with the interchangeable lens is possible but it is not possible to acquire image circle information of the interchangeable lens from the interchangeable lens. Moreover, when the camera body 100 can communicate with the interchangeable lens and acquire image circle information through communication with the interchangeable lens, the camera controller 140 may not display the correction range setting item on the shake correction menu screen or the old lens registration screen, or may gray out the correction range setting item.

In each of the above embodiments, the case where the camera body 100 cannot acquire image circle information from the old lens (interchangeable lens) has been described. However, the present disclosure can also be applied when the camera body 100 is capable of acquiring image circle information from the interchangeable lens. For example, when a hood or a filter is attached to the tip of the interchangeable lens as described above, the hood or the filter enters the image circle of the interchangeable lens and the image circle of the interchangeable lens is substantially narrowed, but the camera body 100 cannot recognize that a hood or a filter is attached to the interchangeable lens. In this case, even if image circle information can be acquired, vignetting may occur in the captured image. Therefore, even when the camera body 100 can acquire image circle information from the interchangeable lens, the correction range setting screen may be displayed to automatically set the correction range. With this, when a hood or a filter is attached to the tip of the interchangeable lens, the presence or absence of the vignetting is actually detected, and the movable amount of the imaging sensor 110 can be appropriately narrowed. Therefore, even in such a case, the occurrence of vignetting in the captured image can be suppressed.

In each of the above embodiments, when the vignetting is detected, the imaging sensor 110 is moved to the right lower side in the diagonal direction. However, in the present disclosure, when the vignetting is detected, the imaging sensor 110 may be moved to the lower left side, the right upper side, or the upper left side in the diagonal direction. Further, the imaging sensor 110 may be moved to two or more predetermined directions of the right lower side, the lower left side, the right upper side, or the upper left side. When the detected movable amount is different depending on the moving direction, the movable amount limitation rate corresponding to the smaller movable amount may be set as the setting value of the correction range setting. In the interchangeable lens such as an old lens, the optical axis of the interchangeable lens may be displaced due to aging or the like. In this case, the optical axis of the interchangeable lens does not match the center of the imaging sensor at the sensor reference position, the center of the image circle is eccentric with respect to the center of the imaging sensor. As a result, there is a case where a difference regarding the degree of vignetting occurs depending on the moving direction. In the case where the center of the movable range of the imaging sensor is deviated from the original position due to aging or the like of the mechanism component of the sensor driving unit 181, the center of the image circle is decentered without being coincident with the center of the imaging sensor at the sensor reference position, and as a result, there is a case where a difference regarding the degree of vignetting occurs depending on the moving direction. According to the present embodiment, even when the eccentricity is generated, the vignetting can be detected with high accuracy and the occurrence of vignetting in the captured image can be suppressed.

Each of the above-described embodiments describes a case of capturing a still image, but the present disclosure can also be applied to a case of capturing a moving image.

As described above, the embodiments are described as an example of the technique in the present disclosure. For this purpose, the accompanying drawings and the detailed description are provided.

Accordingly, some of the constituent elements described in the accompanying drawings and the detailed description may also include constituent elements that are not indispensable for solving the problem in order to exemplify the above technique, in addition to indispensable constituent elements for solving the problem. Therefore, these constituent elements that are not indispensable are not to be immediately recognized to be indispensable on the basis of the fact that these constituent elements that are not indispensable are described in the accompanying drawings or the detailed description.

In addition, since the above-described preferred embodiment is intended to exemplify the technique in the present disclosure, it is possible to make various changes, replacements, additions, omissions, and the like within the scope of claims or the equivalent thereof.

INDUSTRIAL APPLICABILITY

The idea of the present disclosure can be applied to an imaging apparatus (such as a digital camera, a camcorder, a mobile phone, and a smartphone) having an imaging function.

DESCRIPTION OF REFERENCE CHARACTERS 1 digital camera
100 camera body
110 imaging sensor
111 ADC
112 TG
120 touch display
130 operating unit
131 joy stick
140 camera controller
141 RAM
14 flash memory
150 body mount 160 power supply
170 card slot
181 sensor driving unit
182 position sensor
183 BIS processing unit
184 gyro sensor
200 interchangeable lens
210 zoom lens
211 zoom lens driving unit
220 OIS lens
221 OIS drive unit
222 position sensor
223 OIS processing unit
224 gyro sensor
230 focus lens
233 focus lens driving unit
240 lens controller
241 RAM
242 flash memory
250 lens mount
260 aperture
262 diaphragm drive unit
1000 camera information server
C image circle
Fa gaze frame
Rmax maximum movable range
Ra limited movable range
rmax radius of maximum movable range
ra radius of limited movable range
dmax maximum movement distance (maximum movable amount)
da limited drive distance (limited movable amount)
V vignetting

The invention claimed is:

1. An imaging apparatus comprising:
a body mount to which an interchangeable lens is attachable;
an imaging sensor that captures an object image formed through the interchangeable lens attached to the body mount to generate image data;
a driver that performs image blur correction by moving the imaging sensor in a plane perpendicular to an optical axis; and
a controller that causes the driver to move the imaging sensor, wherein
the interchangeable lens includes a first interchangeable lens that cannot communicate with the imaging apparatus and/or a second interchangeable lens that can communicate with the imaging apparatus but the controller cannot acquire information indicating size of an image circle from the second interchangeable lens, and
when the first interchangeable lens or the second interchangeable lens is attached to the body mount, the controller
causes the driver to move the imaging sensor automatically, thereby detecting a movable amount of the imaging sensor that does not cause a vignetting in the captured image at a time when moving the imaging sensor for image blur correction, and
causes the driver to move the imaging sensor within a range of the detected movable amount.

2. The imaging apparatus according to claim 1, wherein the controller moves the imaging sensor maximally by the maximum movable amount with a sensor reference position as a reference, to determine whether there is a vignetting in the captured image indicated by the image data generated by the imaging sensor at a position where the sensor is moved maximally,
when there is a vignetting, until it is determined that there is no vignetting, the controller repeatedly makes the movable amount of the imaging sensor smaller than the current movable amount and moves the imaging sensor maximally by the smaller movable amount with a sensor reference position as a reference, to determine whether there is a vignetting in the captured image indicated by the image data generated by the imaging sensor at a position where the imaging sensor is moved maximally, and
the controller defines the movable amount when it is determined that there is no vignetting as a movable amount that does not cause vignetting in the captured image.

3. The imaging apparatus according to claim 1, wherein the controller determines whether or not a vignetting occurs in the captured image based on a luminance difference between luminance indicated by a signal output from a predetermined pixel of a corner portion of the imaging sensor when the imaging sensor is at a sensor reference position and a luminance indicated by a signal output from the predetermined pixel when the imaging sensor is moved.

4. The imaging apparatus according to claim 1, further comprising:
an operation unit that accepts a user operation,
a storage unit, and
a display unit that displays an image, wherein
the controller stores a numerical value relating to the detected movable amount into the storage unit in association with a combination of the identification information of the interchangeable lens registered based on the user operation to the operation unit and the imaging condition set for the interchangeable lens when the movable amount is detected,
when the operation unit receives a user operation for causing the display unit to display a selection screen displaying all of the registered combinations, the controller reads all of the combinations registered from the storage unit and displays the selection screen on the display unit, and
when the operation unit receives a user operation for selecting one combination from the combinations displayed on the selection screen, the controller causes the driver to move the imaging sensor within the range of the movable amount indicated by the numerical value relating to the movable amount associated with the selected one combination.

5. The imaging apparatus according to claim 1, wherein in the case in which the controller can change the photographing condition of the interchangeable lens,
the controller
performs detection of a movable amount in which vignetting does not occur a plurality of times while changing the photographing conditions, and
sets the smallest movable amount among the movable amounts detected in the plurality of times as a movable amount for the interchangeable lens.

* * * * *